United States Patent [19]

Kishiro et al.

[11] Patent Number: 5,025,082

[45] Date of Patent: Jun. 18, 1991

[54] AROMATIC POLYESTER, AROMATIC POLYESTER-AMIDE AND PROCESSES FOR PRODUCING THE SAME

[75] Inventors: Osamu Kishiro, Atsugi; Hiroshi Kamata, Yokohama; Hideko Sakai, Tokyo, all of Japan

[73] Assignee: Mitsubishi Kasei Corporation, Tokyo, Japan

[21] Appl. No.: 395,683

[22] Filed: Aug. 18, 1989

[30] Foreign Application Priority Data

Aug. 24, 1988 [JP] Japan ................................. 63-210155
Oct. 11, 1988 [JP] Japan ................................. 63-255590
May 9, 1989 [JP] Japan ................................. 1-115829

[51] Int. Cl.$^5$ ........................ C08G 63/02; C08G 63/18
[52] U.S. Cl. ................................. 528/190; 528/176; 528/183; 528/184; 528/185; 528/193; 528/194
[58] Field of Search ............... 528/176, 190, 193, 194, 528/183, 184, 185

[56] References Cited

U.S. PATENT DOCUMENTS

| | | | |
|---|---|---|---|
| 3,637,595 | 1/1972 | Cottis et al. | 260/47 C |
| 4,067,852 | 1/1978 | Calundann | 260/47 C |
| 4,083,829 | 4/1978 | Calundann et al. | 260/47 C |
| 4,130,545 | 12/1978 | Calundann | 260/40 P |
| 4,169,933 | 10/1979 | Jackson, Jr. et al. | 528/190 |
| 4,242,496 | 12/1980 | Jackson, Jr. et al. | 528/190 |
| 4,272,625 | 6/1981 | McIntyre et al. | 528/183 |
| 4,337,191 | 6/1982 | Faustritsky | 524/599 |
| 4,355,132 | 10/1982 | East et al. | 524/602 |
| 4,520,208 | 5/1985 | Hayashi et al. | 549/308 |
| 4,599,397 | 7/1986 | Yoshimura et al. | 528/190 |
| 4,609,720 | 9/1986 | Yoshimura et al. | 528/190 |
| 4,664,972 | 5/1987 | Connolly | 428/290 |
| 4,722,993 | 2/1988 | Hisgen et al. | 528/183 |
| 4,857,626 | 8/1989 | Kishiro et al. | 528/176 |

FOREIGN PATENT DOCUMENTS

| | | |
|---|---|---|
| 0267984 | 11/1986 | European Pat. Off. . |
| 0271929 | 12/1987 | European Pat. Off. . |
| 0298883 | 7/1988 | European Pat. Off. . |
| 6239623 | 8/1985 | Japan . |
| 6248722 | 8/1985 | Japan . |
| 62206017 | 3/1986 | Japan . |
| 6416823 | 7/1987 | Japan . |
| 63-120730 | 5/1988 | Japan . |
| 63-183923 | 7/1988 | Japan . |

Primary Examiner—Morton Foelak
Assistant Examiner—T. Mosley
Attorney, Agent, or Firm—David G. Conlin; Ernest V. Linek

[57] ABSTRACT

The aromatic polyester and aromatic polyester-amide of the present invention have an excellent heat resistance (soldering resistance) and are excellent in fluidity, and therefore, excellent in moldability, because they show liquid crystallinity in a molten state. In view of mechanical characteristics, the aromatic polyester and aromatic polyester-amide of the present invention have a high modulus of elasticity and are excellent in mechanical strength. In addition, the aromatic polyester and aromatic polyester-amide of the present invention have an advantage that they can be molded at a temperature of 350° C. or below, especially, 320° C. or below.

The aromatic polyester and aromatic polyester-amide of the present invention have utility in injection molded articles, films, fibers, etc., due to the above properties thereof.

In addition, the aromatic polyester and aromatic polyester-amide of the present invention become molten state at a temperature of 320° C. or below, therefore, the aromatic polyester and aromatic polyester-amide can be drawn out from a reaction vessel by application of pressure or by gravity after completion of polymerization, when the polymer is produced by melt polymerization method. This is another advantage of the present invention.

10 Claims, 8 Drawing Sheets

AROMATIC POLYESTER, AROMATIC POLYESTER-AMIDE AND PROCESSES FOR PRODUCING THE SAME

BACKGROUND OF THE INVENTION

This invention relates to a novel aromatic polyester, aromatic polyester-amide and processes for producing the same.

The aromatic polyester and the aromatic polyester amide of the present invention show liquid crystallinity (optical anisotropy) at melting so that they exhibit excellent properties in moldability (fluidity), and have high modulus of elasticity, high strength, high heat resistance and also low water absorption. They are particularly excellent in soldering resistance so that they can be utilized as an electric or electronic material such as a precision component, a connector, an IC socket, an encapsulated material, etc., a molding, such as a part for automobile, etc., a film, a fiber, etc.

Also, when the processes of the present invention are employed, the aromatic polyester and the aromatic polyester-amide of the present invention can be prepared by conventional and usual apparatus for preparing polyesters, thereby improving productivity and reduced costs.

In recent years, in the fields of moldings of precision instrument parts, electric or electronic parts, or automobile parts, or film, fiber, etc., have seen an increased demand for engineering plastics excellent properties in terms of rigidity, heat resistance, chemical resistance, etc. As a polyester satisfying such demands in recent years, a liquid crystal polyester, for example, a copolyester showing melt anisotropy, obtained by polyethylene terephthalate and p-acetoxybenzoic acid ("Journal of Polymer Science Polymer Chemistry Edition ", vol. 14, p. 2043 (1976) and Japanese Patent Publication No. 18016/1981 ), etc. has attracted some attention. This liquid crystalline copolyester, obtained by polyethylene terephthalate and p-acetoxybenzoic acid, has excellent mechanical properties without blending a reinforcing material and, for example, it has been reported that it has 5-fold or more of modulus of elasticity, 4-fold or more of strength and 25-fold or more of impact strength as compared with polyethylene terephthalate.

However, this liquid crystalline copolyester does not have good heat resistance, and particularly, it has no soldering resistance so that it cannot be used for electronic parts, etc. Thus, it has disadvantages that limit its use considerably.

On the other hand, as an aromatic polyester containing a constitutional unit represented by

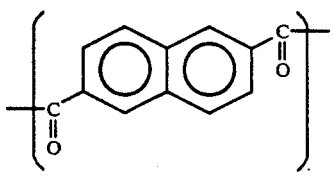

various examples have hitherto been known. For example, there are described in British Polymer Journal, 154 (1980); Macromolecules, 16 (7), 1027 (1983); IUPAC Macromol. Symp. 28th, 200 (1982); U.S. Pat. Nos. 4,067,852 and No. 4,664,972; Japanese Patent Applications Laid-Open No. 156313/1987, No. 206017/1987, No. 39623/1987 and No. 48722/1987; etc.

These aromatic polyesters have disadvantages of lacking soldering resistance, or in those cases having soldering resistance, they sometimes cannot be prepared by conventional polyester producing apparatus (for example, the bulk method reacting in a vertical type polymerization reactor at 320° C.).

For example, according to British Polymer Journal, 154 (1980) and U.S. Pat. No. 4,067,852, a polyester comprising

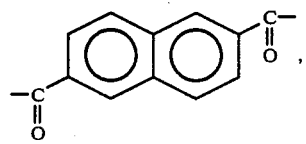

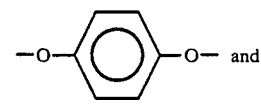

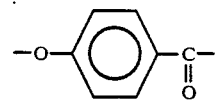

has high melting point of 330° C. or higher so that it cannot be prepared by the conventional apparatus for polyester, which is conventionally used at 320° C. or lower. For this reason, this polyester is prepared with the use of a solvent or at a temperature as high as 335° C. A polyester comprising

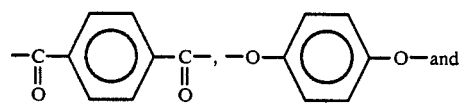

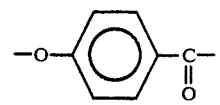

has further high melting point (500° C. or higher), so that production by the conventional apparatus for producing polyester is impossible.

Also, according to the description of Macromolecules, 16, 1027, (1983), a polyester comprising

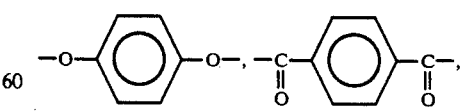

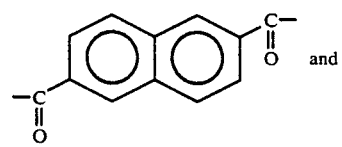

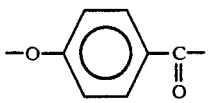

has been described in detail, but melting points thereof are as high as 320° C. or higher in any composition ratio of these four components whereby they cannot be prepared by the conventional polymerizing apparatus which has been used at 320° C. or lower.

In the above document, the melting point has been lowered by using

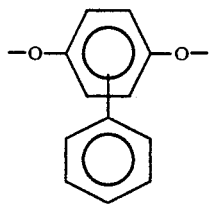

in place of

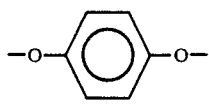

but in this case, while the melting point has remarkably been lowered, the polymer becomes amorphous so that soldering resistance at 260° C. is lost.

Regarding a polyester comprising

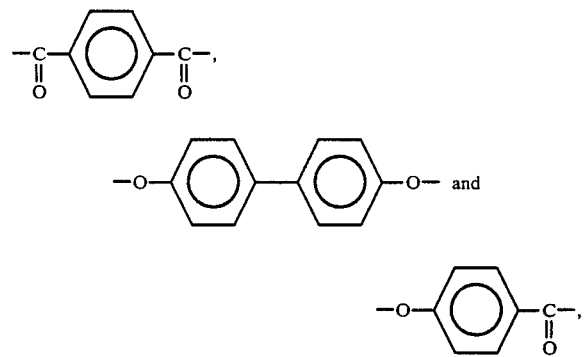

there are many reports, but in this case, it is clear that it cannot be prepared by the conventional and usual polyester-producing apparatus.

Further, as an aromatic polyester-amide containing a constitutional unit represented by

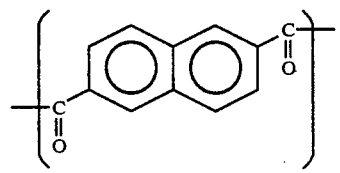

there are descriptions in British Polymer Journal, vol. 13, No. 1, p. 5 (1981), Japanese Patent Applications Laid-Open No. 177021/1982 and No. 27391/1980, etc., but any one of which only uses, as a nitrogen-containing component, an aromatic diamine compound unit or an aromatic amino-oxy compound unit.

Regarding an aromatic polyester- amide containing an aminocarboxylic acid unit, there is a description in macromolecules, vol. 20, No. 4, p. 877 (1987), but this is high content in the aminocarboxylic acid unit as 50 equivalent % so that it can be considered to involve a problem in water absorption properties. Also, there is no description whether this aromatic polyester -amide has liquid crystallinity.

Regarding an aromatic polyester- amide containing an aminophenol unit, there are descriptions in British Polymer Journal, vol. 13, No. 1, p. 5 (1981), Japanese Patent Application Laid-Open No. 177021/1987 and No. 27391/1980, but any one of which has problems that they have high softening points, cannot be produced by the conventional polyester-producing apparatus, and also do not show any liquid crystallinity. Further, there is no description concerning soldering resistance. Moreover, in Japanese Patent Application Laid-Open no. 284221/1988, there is a description concerning an aromatic polyester amide using a starting material of m-orientation, and examples of polymerization at 320° C. have been mentioned. However, each of which has a heat deflection temperature of 200° C. or lower and thus, it would be clear that they do not have practical soldering resistance (260° C. .10 sec).

The present inventors have investigated, in such circumstances, to provide an aromatic polyester and an aromatic polyester- amide which have high modulus of elasticity, high strength and low water absorption, are excellent in heat resistance, particularly in soldering resistance (240° C., or 260° C., 10 sec or more ) and yet excellent in fluidity and good in moldability, and which are suitable for engineering plastics, and to provide processes for producing these by using the conventional and usual polyester-producing apparatus (for example, a vertical type polymerization reactor used in the bulk method at a temperature of 320° C. or below) with good efficiency. As the results, they have found that the aromatic polyester and the aromatic polyester-amide having the composition mentioned hereinbelow in detail have satisfied the above objectives, and based on this finding the present invention has been accomplished.

SUMMARY OF THE INVENTION

In a first aspect of the present invention, there is provided an aromatic polyester which comprises
(a) 2 to 40 mole % of 2,6-naphthalenedicarboxylic acid unit represented by the formula (1):

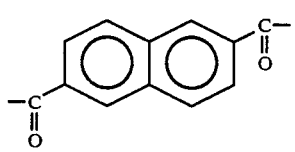

(1)

(b) 0 to 40 mole % of terephthalic acid unit represented by the formula (2):

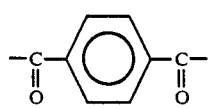

(2)

(c) 3 to 40 mole % of 4,4'-dihydroxydiphenyl unit represented by the formula (3):

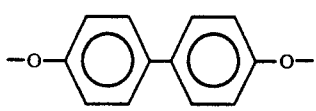
(3)

(d) 2 to 40 mole % of at least one of aromatic diol units represented by the following formula (4) to (8):

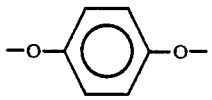
(4)

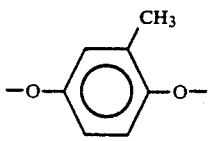
(5)

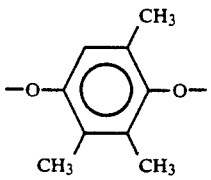
(6)

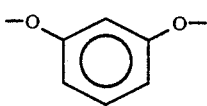
(7)

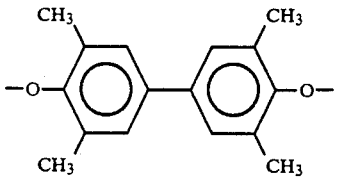
(8)

and
(e) 20 to 80 mole % of p-hydroxybenzoic acid unit represented by the formula (9):

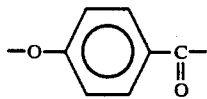
(9)

The mole % is a value based on [1]+[2]+[3]+[4]+[5]+[6]+[7]+[8]+[9](hereafter represented by [A]), when molar numbers of the above constitutional units represented by (1), (2), (3), (4), (5), (6), (7), (8) and (9) are represented by [1], [2], [3], [4], [5], [6], [7], [8] and [9], respectively, and the aromatic polyester having a melt viscosity of 10 poise or more at 320° C. and 100 sec$^{-1}$.

In a second aspect of the present invention, there is provided a process for producing the aromatic polyester as defined above.

In a third aspect of the present invention, there is provided aromatic polyester-amide which mainly comprises (k) 2 to 50 mole % of 2,6-naphthalenedicarboxylic acid unit represented by the formula (19):

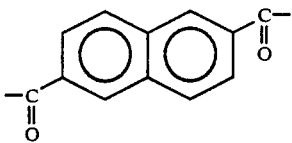
(19)

(l) 0 to 45 mole % of terephthalic acid unit represented by the formula (20):

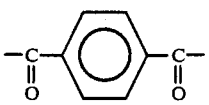
(20)

(m) 2 to 50 mole % of 4,4'-dihydroxydiphenyl unit represented by the formula (21):

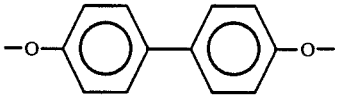
(21)

(n) 0 to 75 mole % of P-hydroxybenzoic acid unit represented by the formula (22):

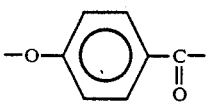
(22)

(o) 1 to 30 mole % of the unit represented by the formula (23):

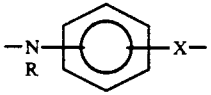
(23)

wherein X represents an oxygen atom of a carbonyl group; and R represents a hydrogen atom or a hydrocarbon group having 1 to 6 carbon atoms, the mole % is a value based on [19]+[20]+[21]+[22]+[23](hereafter represented by [C]), when molar numbers of the above constitutional units represented by (19), (20), (21), (22) and (23) are represented by [19], [20], [21], [22]and [23], respectively, and the aromatic polyester-amide having a melt viscosity of 10 poise or more at 320° C. and 100 sec$^{-1}$.

In a fourth aspect of the present invention, there is provided a process for producing the aromatic polyesteramide as defined above.

DETAILED DESCRIPTION OF THE INVENTION

Figure 1:
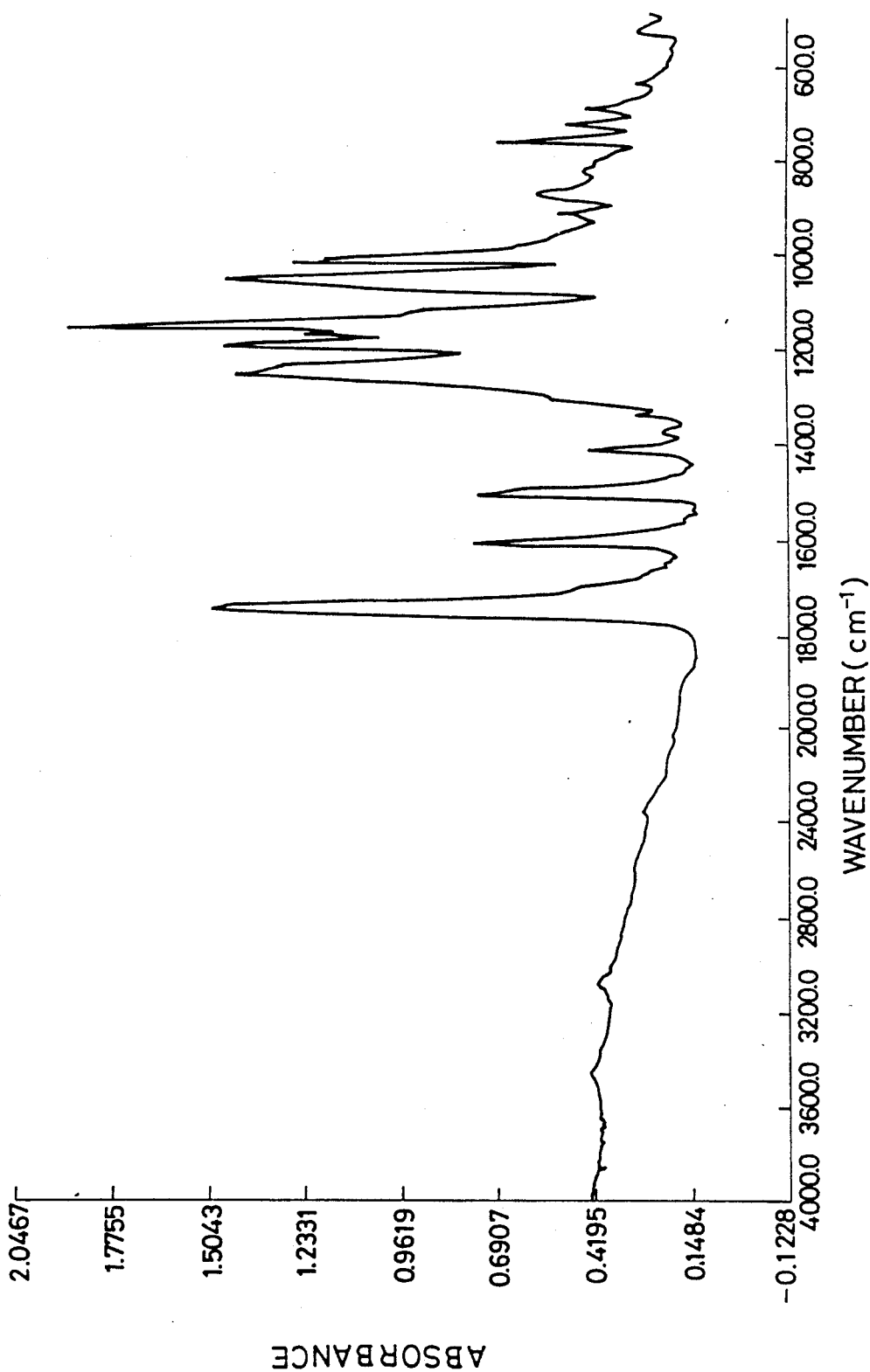

The aromatic polyester of the present invention is an aromatic polyester which comprises
(a) 2 to 40 mole % of 2,6-naphthalenedicarboxylic acid unit represented by the formula (1):

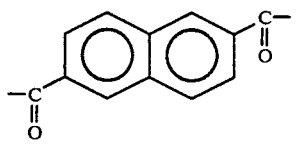
(1)

(b) 0 to 40 mole % of terephthalic acid unit represented by the formula (2):

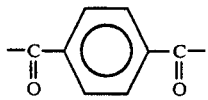
(2)

(c) 3 to 40 mole % of 4,4'-dihydroxydiphenyl unit represented by the formula (3):

(3)

(d) 2 to 40 mole % of at least one of aromatic diol units represented by the following formulae (4) to (8):

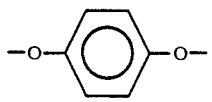
(4)

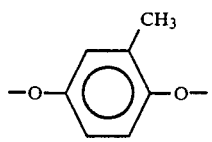
(5)

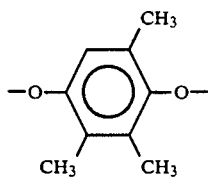
(6)

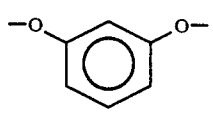
(7)

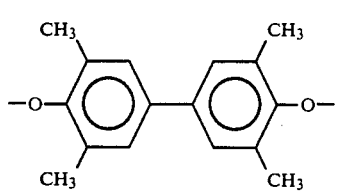
(8)

and (e) 20 to 80 mole % of p-hydroxybenzoic acid unit represented by the formula (9);

(9)

The mole % being a value based on [A] and the aromatic polyester having a melt viscosity of 10 poise or more at 320° C. and 100 sec$^{-1}$.

The aromatic polyester of the invention can be preferably prepared by using as starting materials, (f) 2 to 40 mole % of 2,6-naphthalenedicarboxylic acid represented by the formula (10):

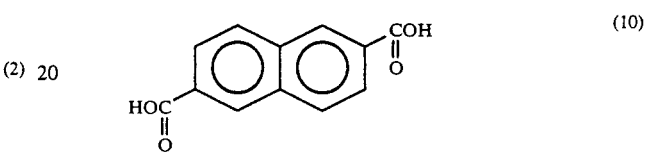
(10)

(g) 0 to 40 mole % of terephthalic acid represented by the formula (11):

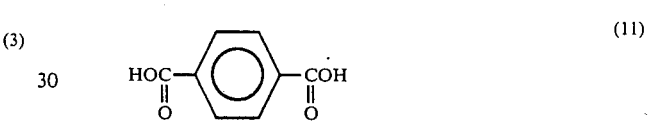
(11)

(h) 3 to 40 mole % of 4,4'-dihydroxydiphenyl represented by the formula (12):

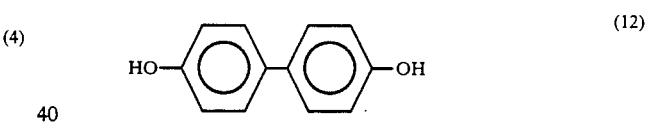
(12)

(i) 2 to 40 mole % of at least one of aromatic diol compounds represented by the following formulae (13) to (17):

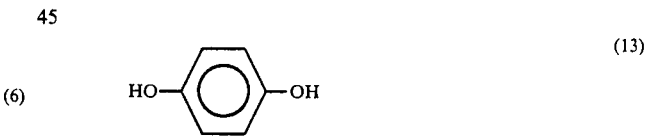
(13)

(14)

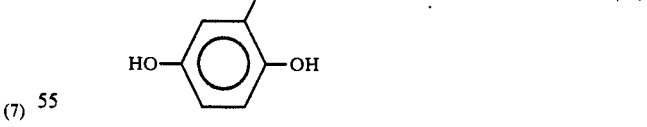
(15)

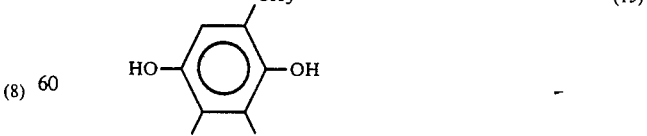
(16)

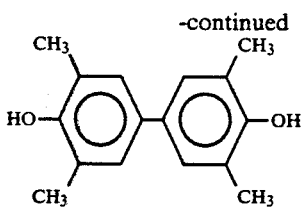
(17)

and (j) 20 to 80 mole % of p-hydroxybenzoic acid represented by the formula (18):

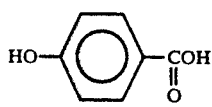
(18)

wherein when molar numbers of the above constitutional units represented by (10), (11), (12), (13), (14), (15), (16), (17) and (18) are represented by [10], [11], [12], [13], [14], [15], [16], [17] and [18], respectively, the mole % being a value based on [10]+[11]+[12]+[13]+[14]+[15]+[17]+[18] (hereafter represented by [B]), reacting the above materials in the presence of an acid anhydride, and further reacting at a temperature of 100° to 400° C. while removing the excess acid anhydrides and acids formed therefrom.

The aromatic polyester and the process for preparing the same of the present invention will be explained in more detail.

In the aromatic polyester of the present invention, as constitutional units, it is an essential requirement that it contains the 2,6-naphthalenedicarboxylic acid unit represented by the above formula (1), the 4,4'-dihydroxydiphenyl unit represented by the formula (3), at least one of the aromatic diol units represented by the formulae (4) to (8) and the p-hydroxybenzoic acid unit represented by the formula (9).

A content of the 2,6-naphthalenedicarboxylic acid unit represented by the formula (1) is 2 to 40 mole %, preferably 3 to 35 mole %, more preferably 3 to 30 mole %, particularly preferably 3 to 15 mole % based on [A]. When the 2,6-naphthalenedicarboxylic acid unit presents in an amount of 2 to 40 mole %, not only liquid crystallinity of the resulting aromatic polyester becomes a higher degree but also it can be prepared by the conventional polyester-producing apparatus (320° C. or lower). The conventional polyester-producing apparatus may include, for example, those as described in "Sen-i Binran" (Genryo-hen), p. 808, FIG. 7.11. Also, "can be prepared" means that the polymer maintains fluidity in a polymerization reactor without solidification so that it can be drawn out from the polymerization reactor. Further, due to a high degree of liquid crystallinity, improvements in modulus of elasticity and moldability can be obtained. If the content of the 2,6-naphthalenedicarboxylic acid unit is less than 2 mole % or exceeds 40 mole %, the produced polymer solidifies during polymerization and becomes hard to draw out from the reactor so that it is not preferred.

A content of the terephthalic acid unit represented by the formula (2) is 0 to 40 mole %, preferably 2 to 35 mole %, more preferably 5 to 30 mole %, particularly preferably 7 to 25 mole % based on [A]. Even when the component (2) is not contained, liquid crystallinity can be developed and the polymer can be prepared by the conventional apparatus, but if it exist in an amount of 40 mole % or less, not only much higher degree of liquid crystallinity can be resulted, but also the polymer can be easily prepared by the conventional polyester-producing apparatus (320° C. or lower). Here, "can be prepared by the conventional apparatus" means as mentioned above. If it exceeds 40 mole %, the produced polymer solidifies during polymerization and becomes hard to draw out from the reactor so that it is not preferred.

A ratio of (2) and (1) ([2]/[1]) is preferably $0 \leq [2]/[1] \leq 10$, and $0.3 [2]/[1] \leq 7$ is particularly preferred. From a standpoint of obtaining a higher modulus of elasticity, it is preferred that [2] is about the same amount as [1] or larger than [1]. If [2]/[1] exceeds 10, a flow initiating temperature becomes high and it becomes difficult to draw out the polymer from a reaction so that it is not preferred.

A content of 4,4'-dihydroxydiphenyl unit represented by the formula (3) is 3 to 40 mole %, preferably 4 to 30 mole %, more preferably 5 to 25 mole % and particularly preferably 10 to 25 mole % based on [A]. When it exists 3 to 40 mole %, it contributes to not only result a higher degree of liquid crystallinity but also make easier to prepare the aromatic polyester by the conventional polyester-producing apparatus (320° C. or lower). If it is less than 3 mole % or exceeds 40 mole %, the produced polymer solidifies during polymerization and becomes hard to draw out from a reactor so that it is not preferred.

It is essential that the aromatic polyester of the present invention contains at least one unit of the aromatic diol units of the formulae (4) to (8).

A total content of the aromatic diol units of the formulae (4) to (8) is 2 to 40 mole %, preferably 2 to 30 mole % based on [A]. When it exists 2 to 40 mole %, it contributes to not only result a higher degree of liquid crystallinity but also make easier to prepare the aromatic polyester by the conventional polyester-producing apparatus (320° C. or lower). If it is less than 2 mole % or exceeds 40 mole %, the produced polymer solidifies during polymerization and becomes hard to draw out from a reactor so that it is not preferred.

Among these aromatic diol units, particularly when the hydroquinone unit of the formula (4) and/or the methylhydroquinone unit of the formula (5) is/are contained, a content of the hydroquinone unit and/or methylhydroquinone unit is preferably 3 to 25 mole %, more preferably 3 to 15 mole % based on [A].

Also, a ratio of the units of the formula (4) and/or the formula (5) and the unit of the formula (3) (([4]+[5])/[3]) is preferably in the range of 0.1 to 10, particularly 0.3 to 5.

When the trimethylhydroquinone unit of the formula (6) and/or the resorcin unit of the formula (7) is/are contained, a content of the trimethylhydroquinone unit and/or resorcin unit is preferably 2 to 25 mole %, more preferably 2 to 15 mole %, particularly preferably 2 to 10 mole % based on [A].

A ratio of the units of the formula (6) and/or the formula (7) and the unit of the formula (3) (([6]+[7])/[3]) is preferably in the range of 0.05 to 5, particularly 0.1 to 2.

When the tetramethylbiphenol unit of the formula (8) is contained, its content is preferably 2 to 20 mole %, particularly 2 to 10 mole % is preferred.

A ratio of the units of the formula (8) and the unit of the formula (3) ([8]/[3]) is preferably in the range of 0.05 to 5, particularly 0.1 to 2.

Of the above aromatic diol units of the formulae (4) to (8), the unit(s) of the formula (4) and/or the formula (5) is/are particularly preferred, and next preferred is the unit of the formula (8).

Regarding the constitutional units of formulae (1) to (8), it is preferred to set their contents so as to satisfy the relation of $0.8 \leq ([1]+[2])/([3]+[4]+[5]+[6]+[7]+[8]) \leq 1.2$. At the range out of the above, degree of polymerization becomes insufficient. More preferably, $0.9 \leq ([1]+[2])/([3]+[4]+[5]+[6]+[7]+[8])$ 1.1, and particularly preferably $0.95 \leq ([1]+[2])/([3]+[4]+[5]+[6]+[7]+[8]) \leq 1.05$.

A content of the p-hydroxybenzoic acid unit represented by the formula (9) is 20 to 80 mole %, preferably 25 to 75 mole %, more preferably 30 to 70 mole %, particularly preferably 40 to 70 mole % based on [A].

When it exists 20 to 80 mole %, it contributes to not only result a higher degree of liquid crystallinity but also make easier to prepare the aromatic polyester by the conventional polyester-producing apparatus (320° C. or lower). If it is less than 20 mole % or exceeds 80 mole %, the produced polymer solidifies during polymerization and becomes hard to draw out from a reaction tank so that it is not preferred.

Regarding the contents of the constitutional units represented by the formulae (1), (2) and (9), it is preferred to satisfy the relationship of $0.1 \leq ([1]+[2])/[9] < 9$, more preferably $0.2 \leq ([1]+[2])/[9] \leq 4$, particularly preferably $1 < ([1]+[2])/[9] \leq 4$.

If the ratio of $([1]+[2])/[9]$ is less than 0.1 or exceeds 9, a flow initiating temperature becomes high and it becomes difficult to draw out the polymer from a reactor so that it is not preferred.

In the present invention, there is no problem to add other components than the above in a small content (about 3 mole % or less based on [A]).

The aromatic polyester-amide of the present invention comprises (k) 2 to 50 mole % of 2,6-naphthalenedicarboxylic acid unit represented by the formula (19):

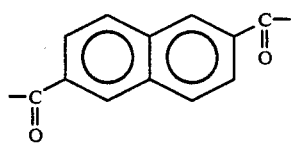

(1) 0 to 45 mole % of terephthalic acid unit represented by the formula (20):

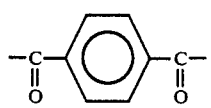

(m) 2 to 50 mole % of 4,4'-dihydroxydiphenyl unit represented by the formula (21):

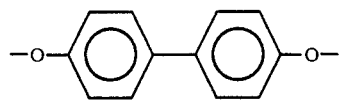

(n) 0 to 75 mole % of p-hydroxybenzoic acid unit represented by the formula (22):

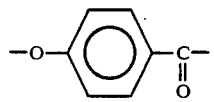

and (o) 1 to 30 mole % of the unit represented by the formula (23)

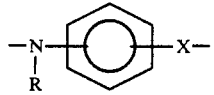

wherein X represents an oxygen atom or a carbonyl group; and R represents a hydrogen atom or a hydrocarbon group having 1 to 6 carbon atoms, the aromatic polyester-amide having a melt viscosity of 10 poise or more at 320° C. and 100 sec$^{-1}$.

Here, when molar numbers of the above constitutional units represented by (19), (20), (21), (22) and (23) are represented by [19], [20], [21], [22] and [23], respectively, each of the mole % is a value based on [19]+[20]+[21]+[22]+[23] (hereafter represented by [C]).

The aromatic polyester-amide of the present invention can be prepared by using, as starting materials, (p) 2 to 50 mole % of 2,6-naphthalenedicarboxylic acid represented by the formula (24):

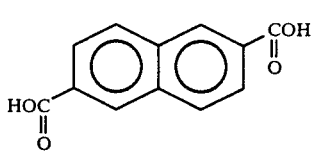

(q) 0 to 45 mole % of terephthalic acid represented by the formula (25):

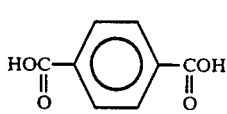

(r) 2 to 50 mole % of 4,4'-dihydroxydiphenyl represented by the formula (26):

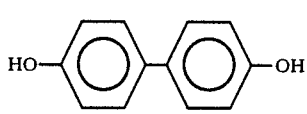

(s) 0 to 75 mole % of p-hydroxybenzoic acid represented by the formula (27):

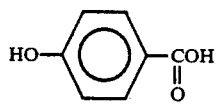

(27)

and (t) 1 to 30 mole % of the compound represented by the formula (28):

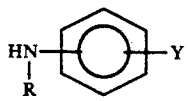

(28)

wherein Y represents a hydroxyl group or a carboxyl group; and R represents a hydrogen atom or a hydrocarbon group having 1 to 6 carbon atoms, wherein when molar numbers of the above constitutional units represented by (24), (25), (26), (27) and (28) are represented by [24], [25], [26], [27] and [28], respectively, each of the mole % is a value based on [24]+[25]+[26]+[27]+[28] (hereafter represented by [D]), reacting the above materials in the presence of an acid anhydride, and further reacting at a temperature of 100 to 400° C. while removing the excess acid anhydrides and the acids formed therefrom.

The aromatic polyester- amide and the process for preparing the same of the present invention will be explained in more detail.

In the aromatic polyester-amide of the present invention, as constitutional units, it is essential requirement that it contains 2,6-naphthalenedicarboxylic acid unit represented by the above formula (19), 4,4'-dihydroxydiphenyl unit represented by the formula (21) and aromatic aminocarboxylic acid unit or amino phenol unit represented by the formula (23).

A content of the 2,6-naphthalenedicarboxylic acid unit represented by the formula (19) is 2 to 50 mole %, preferably 3 to 35 mole %, more preferably 5 to 30 mole % based on [C]. When the 2,6-naphthalenedicarboxylic acid unit presents in an amount of 2 to 50 mole %, not only liquid crystallinity of the resulting aromatic polyester becomes a higher degree but also the polymer can be prepared by the conventional polyester-producing apparatus (320° C. or lower). Also, "can be prepared" means that the polymer maintains fluidity in a polymerization reactor without solidification so that it can be easily drawn out from the polymerization reactor.

A higher degree of liquid crystallinity brings about improvements in modulus of elasticity and moldability (improvement in fluidity, i.e. lowering in the melt viscosity). If the content of the 2,6-naphthalenedicarboxylic acid unit is less than 2 mole %, not only the produced polymer solidifies during polymerization and becomes hard to draw out from a reactor but also lowering in modulus of elasticity and lowering in moldability (fluidity) are caused so that it is not preferred.

A content of the aromatic aminocarboxylic acid unit or the aminophenol unit represented by the formula (23) is 1 to 30 mole %, preferably 2 to 25 mole %, more preferably 3 to 20 mole % based on [C].

When it exist 1 to 30 mole %, a higher heat resistance as well as a higher modulus of elasticity and a higher strength are resulted.

If it exceeds 30 mole %, fluidity becomes low or water absorption property becomes bad so that it is not preferred.

The aromatic aminocarboxylic acid unit represented by the formula (23) can be formed from the aromatic aminocarboxylic acid represented by the formula (28) or a reactive derivative thereof Specific examples of the aromatic aminocarboxylic acid may include m-aminobenzoic acid, p-aminobenzoic acid, p-N-methylaminobenzoic acid, p-N-phenylaminobenzoic acid, etc. and two or more among these may be used.

Among these, m-aminobenzoic acid and p-aminobenzoic acid are preferred and p-aminobenzoic acid is particularly preferred.

The aminophenol unit represented by the formula (23) can be formed from an aminophenol compound monomer represented by the formula (28) or a reactive derivative thereof. As the aminophenol compound monomers, there may be mentioned m-aminophenol, p-aminophenol, p-N-methylaminophenol, p-N-phenylaminophenol, p-acetaminophenol acetate, etc., but it is not limited by these. Among these, m-aminophenol and p-aminophenol, etc. are preferred, and p-aminophenol is particularly preferred. Also, these may be used only one kind, or else may be used two or more.

The 4,4'-dihydroxydiphenyl unit represented by the formula (21) can be formed by 4,4'-dihydroxydiphenyl represented by the formula (26) or a reactive derivative thereof. Specific examples thereof may include 4,4'-dihydroxydiphenyl, 4,4'-diacetoxydiphenyl, 4,4'-dipropoxydiphenyl, 4,4'-dibenzoyloxydiphenyl, etc., but it is not limited by these. Among these, 4,4'-dihydroxydiphenyl is preferred. A content of the 4,4'-dihydroxydiphenyl unit is selected from the range of 2 to 50 mole %, preferably 3 to 35 mole %, more preferably 5 to 30 mole % based on [C]. If it is less than 2 mole %, an effect of increasing the degree of liquid crystallinity cannot be shown and preparation becomes hard by the conventional polyester-producing apparatus (320° C. or lower), and if it exceeds 50 mole %, degree of polymerization becomes insufficient so that it is not preferred.

In this invention, "to increase the degree of liquid crystallinity" means that it brings about improvements in modulus of elasticity and moldability (improvement in fluidity, i.e. lowering in the melt viscosity).

The aromatic polyester-amide of the present invention may further contain, as a constitutional component, the terephthalic acid unit represented by the above formula (20). The terephthalic acid unit can be formed from terephthalic acid or a reactive derivative thereof. Examples thereof may include terephthalic acid, dimethyl terephthalate, diphenyl terephthalate, terephthaloyl dichloride, etc., but it is not limited by these. Among these, terephthalic acid is preferred. The content of the terephthalic acid unit is 0 to 45 mole %, preferably 0 to 40 mole %, more preferably 0 to 35 mole % based on [C]. If it exceeds 45 mole %, it becomes hard to produce by the conventional polyester-producing apparatus or degree of polymerization becomes insufficient so that it is not preferred. When the aromatic polyester-amide contains, as the unit represented by the formula (23), the aminophenol unit of the formula:

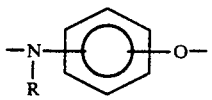

wherein R is the same as defined above, the content of the terephthalic acid unit is preferably 3-35 mole %, more preferably 5-30 mole %.

Also, when the unit represented by the formula (23) is the aromatic aminocarboxylic acid unit, it is preferred to satisfy the relation of $$0.9 \leq ([19]+[20])/[21] \leq 1.1$$

preferably $$0.95 \leq ([19]+[20])/[21] \leq 1.05$$

when the unit represented by the formula (23) is the aminophenol unit, $$0.9 \leq ([19+[20])/([21]+[23]) \leq 1.1$$

preferably $$0.95 \leq ([19]+[20])/([21]+[23]) \leq 1.05.$$

If out of the above range, degree of polymerization becomes insufficient so that it is not preferred.

The aromatic polyester-amide of the present invention can further contain, as a constitutional unit, the p-hydroxybenzoic acid unit represented by the above formula [22]. The p-hydroxybenzoic acid unit can be prepared from p-hydroxybenzoic acid unit or a reactive derivative thereof. Examples thereof may include p-hydroxybenzoic acid, p-acetoxybenzoic acid, phenyl p-hydroxybenzoate, etc., but it is not limited by these. Among these, p-hydroxybenzoic acid is preferred. Also, the content of the p-hydroxybenxoic acid unit is 0 to 75 mole %, preferably 10 to 60 mole %, more preferably 30 to 60 mole % based on [C].

If it exceeds 75 mole %, fluidity becomes bad or it becomes hard to produce by the conventional polyester-producing apparatus so that it is not preferred.

In the aromatic polyester - amide of the present invention, there is no problem to add other components than the components of the formulae (19) to (23) in a small content (about 3 mole % or less).

The aromatic polyester and the aromatic polyester-amide of the present invention show optical anisotropy (liquid crystallinity) in a melting state whereby they show excellent moldability, high modulus of elasticity, high strength and good heat resistance by containing the above constitutional units with the respective specified ratios Also, there is a great merit that even when the conventional polyester-producing apparatus (for example, a vertical type polyethylene terephthalate producing apparatus) is used, the polymer can be drawn from the bottom of the reactor (hereinafter referred to drawn property). It can be considered that the flow initiating temperature becomes low by the combination of the above constitutional units in the specific ratio.

In the aromatic polyester, by containing the components of the formulae (1), (3), at least one of (4) to (8) and (9), and in the aromatic polyester-amide, by containing the components of the formulae (19), (21) and (23), it cannot be expected to obtain effect of improving heat resistance and thus providing soldering resistance, effect of not increasing the flow initiating temperature so high and making a flowable state generally at a temperature of 320° C. or lower and effect of rather lowering the melt viscosity whereby improving moldability (fluidity).

It can be clear from the fact as shown below that the aromatic polyester and the aromatic polyester-amide of the present invention are excellent in heat resistance. For example, when the absolute values of complex elastic moduli (E*) measured by Vibron (110 Hz) at 40° C. and 150° C. are defined as $|E^*|_{40}$ and $|E^*|_{150}$, respectively, these values are as follows.

$$|E^*|_{150}/|E^*|_{40} \geq \tfrac{1}{2}$$

$$|E^*|_{150} \geq 4.0 \times 10^{10} \text{dyne/cm}^2 (4.0 \text{ GPa})$$

$$|E^*|_{40} \geq 8.0 \times 10^{10} \text{dyne/cm}^2 (8.0 \text{ GPa})$$

In the above, complex elastic modulus (E*) is represented by the following expression:

$$E^* = E' + iE''$$

wherein E' is dynamic modulus and E'' is loss modulus, and the absolute value of complex elastic modulus is represented by the following expression:

$$|E^*| = \sqrt{E'^2 + E''^2}$$

When the composition ratio of the polymer is selected adequately, it is possible to obtain an aromatic polyester or an aromatic polyester-amide showing the following values.

$$|E^*|_{150}/|E^*|_{40} \geq \tfrac{1}{2}$$

$$|E^*|_{150} \geq 6.0 \times 10^{10} \text{dyne/cm}^2 (6.0 \text{ GPa})$$

$$|E^*|_{40} \geq 12.0 \times 10^{10} \text{dyne/cm}^2 (12.0 \text{ GPa})$$

Also, the absolute value of complex elastic modulus measured at 240° C. is $$|E^*|_{240} \geq 2.0 \times 10^{10} \text{ dyne/cm}^2 (2.9 \text{ GPa})$$

and this shows extremely high heat resistance of the polymers of the present invention. Thus, the aromatic polyester and the aromatic polyester-amide have soldering resistance at a temperature as high as 240° C.

Further, the composition ratio of the polymer is selected adequately, it is possible to obtain a polymer showing an extremely high heat resistance in which the absolute value of complex elastic modulus measured at 260° C. is $$|E^*|_{260} \geq 2.0 \times 10^{10} \text{ dyne/cm}^2 (2.0 \text{ GPa})$$

Thus, the aromatic polyester and the aromatic polyester-amide have soldering resistance even at a temperature as high as 260° C.

Thus, the aromatic polyester and the aromatic polyester-amide of the present invention show high modulus of elasticity, as mentioned above, at 240° C., and further at 260° C. when the composition ratio of the polymer is selected adequately, and have a great advantage that they can be prepared by the melt polymerization method at 320° C. with the conventional polyester-producing apparatus.

Also, they have low melt viscosities as rheological characteristics whereby good in moldability.

The aromatic polyester and the aromatic polyester-amide of the present invention are required to have melt viscosities of 10 poise or more measured at the conditions of a temperature of 320° C. and a shear rate of 100 sec$^{-1}$, and if it is less than 10 poise, sufficient strength cannot be obtained. A preferred melt viscosity at the above measurement conditions is 100 poise or more, particularly preferred is 100 to 10000 poise in the point of moldability.

The aromatic polyester and the aromatic polyester-amide of the present invention can be prepared by using starting materials corresponding to the above constitutional units in a predetermined ratio and effecting condensation polymerization with a well known polymerization method such as melt polymerization method, solution polymerization method, interfacial polymerization method, etc. Particularly, the melt polymerization method is advantageous for industrial production since no post-treatment is necessary after polymerization reaction, while the solution polymerization and the interfacial polymerization have advantage that polymerization reaction can be carried out at relatively lower temperature.

In the case of the melt polymerization method, there can be usually employed a method in which a part of the above starting materials is used as an acylated compound or an ester, and polymerization is carried out at a temperature of 200° to 400° C., or a method, in which an acylation agent is added to the above starting materials and polymerization is effected, etc. Also, in the solution polymerization method or the interfacial polymerization method, a carboxyl group of the starting monomer is generally used as an acid halide, particularly acid chloride, and in the interfacial polymerization method, a hydroxyl group of the starting material is used in the form of a salt.

Particularly, according to the process of the present invention, the aromatic polyester and the aromatic polyester-amide can be produced extremely advantageously and effectively in the points of production costs and workability, etc.

The composition of the produced aromatic polyester and the aromatic polyester-amide of the present invention is the same as that of the charged starting materials. Therefore, the composition of the starting materials is determined according to the desired composition of the aromatic polyester or the aromatic polyester-amide.

As the catalyst, there may be used BuSnOOH, Bu$_2$SnO, Ti(Oi—Pr)$_4$, Zn(OAc)$_2$, Sn(OAc)$_2$, Sb$_2$O$_3$, Co(OAc)$_2$, KOAc, etc. but it may not be used.

Also, as the acylation agent, there may be mentioned, for example, acid anhydrides such as acetic anhydride, propionic anhydride, benzoic anhydride, etc., and among these, acetic anhydride is particularly preferred. These acid anhydrides may be used singly or in combination of two or more. It is preferred to use the acid anhydrides in such an amount that the molar ratio of the acid anhydride and the total of an amino group, a hydroxyl group in the starting materials is 0.8 to 2.0, preferably 1.0 to 1.5. That is, when the mole number of the acid anhydride is represented by [Anh], and mole numbers of the starting materials represented by the formulae (12) to (18) and (26) to (28) are represented by [12] to [18] and [26] to [28], respectively, it is preferred for the aromatic polyester to satisfy the relation of $$0.8 \leq \frac{[Anh]}{2 \times \{[12] + [13] + [14] + [15] + [16] + [17]\} + [18]} \leq 2.0$$

preferably $$1.0 \leq \frac{[Anh]}{2 \times \{[12] + [13] + [14] + [15] + [16] + [17]\} + [18]} \leq 1.5$$

and for the aromatic polyester-amide, $$0.8 \leq \frac{[Anh]}{2 \times [26] + [27] + n \times [28]} \leq 2.0$$

preferably $$1.0 \leq \frac{[Anh]}{2 \times [26] + [27] + n \times [28]} \leq 1.5$$

wherein n is 1 when the formula (23) is an aromatic aminocarboxylic acid and is 2 when the formula (23) is an aminophenol.

Also, the reaction temperature is not particularly limited so long as in the range of 100° to 400° C., but when acylation is first mainly carried out by adding an acid anhydride and then condensation is mainly carried out thereafter, a temperature of 100° to 200° C. is preferred for acylation, and it is advantageous to carry out the condensation at an elevated temperature of 250° to 400° C.

In the present invention, the reaction is carried out while removing the acid anhydride and acids formed therefrom out of the system, and in order to carry out the removal with good efficiency, an inert gas such as nitrogen or argon may be passed through the system or the pressure may be reduced. Also, if the degree of polymerization is to be further increased, it is possible to apply the solid state polymerization method.

The aromatic polyester and the aromatic polyester-amide of the present invention thus obtained show optical anisotropy (liquid crystallinity) in a melting state, whereby have extremely excellent fluidity and thus good in moldability. Accordingly, it is possible to effect usual melt molding such as extrusion molding, injection molding, compression molding, etc., whereby a molded article, film, fiber, etc. can be easily produced. Particularly, it is suitable for precision molded article since they have high fluidity.

Further, at the molding step, to the aromatic polyester or the aromatic polyester-amide of the present invention, may be added fibers such as a glass fiber, carbon fiber, etc., fillers such as talc, mica, calcium carbonate, etc., nuclear agents, pigments, antioxidants, lubricants, stabilizers, flame retardants, other various additives, and other thermoplastic resins, etc. to provide desired characteristics to resulting molded article.

Also, by blending with other polymer or alloying, it is possible to make a composition having both merits of the other polymer and those of the aromatic polyester or the aromatic polyester amide of the present invention.

The present invention will be explained in more detail by referring to the following non-limitative Examples.

For measuring a melt viscosity in Examples, a flow tester (produced by Shimazu Seisakusho K.K.) was used and the conditions of a temperature of 320° C., a shear rate ($\dot{\gamma}$) of 100 sec$^{-1}$ and a length/diameter of a cylinder nozzle=10 were employed.

Regarding IR, as an infrared spectrophotometer, 20DXBFT-IR produced by Nicolet Co. was used, and measured with a solution in hexafluoroisopropanol or KBr disc.

Molding was carried out by using 0.1 oz injection molding machine produced by Nippon Seiko K.K. to prepare a molded piece.

As to Vibron, Rheovibron produced by Toyo Boldwin Co. was used and the above molded piece was measured under 110 Hz.

Optical anisotropy (liquid cyrstallinity) was observed by using a polarized optical microscope attached with a hot stage.

A flow initiating temperature was judged from data of Vibron.

Water absorption was measured according to ASTM-D-570.

Evaluation of soldering resistance was carried out by dipping a sample in a soldering bath at a temperature of 240° C. or 260° C. for 10 seconds in accordance with the condition B in Table 1 of JIS C5034.

EXAMPLE 1

In a reaction vessel equipped with a stirrer, an outlet for evacuation and a N$_2$ inlet, were charged the following starting materials.

| | |
|---|---|
| (1) 4,4'-dihydroxydiphenyl | 16.89 g (0.091 mole) |
| (2) hydroquinone | 9.99 g (0.091 mole) |
| (3) terephthalic acid | 15.07 g (0.091 mole) |
| (4) 2,6-naphthalenedicarboxylic acid | 19.61 g (0.091 mole) |
| (5) p-hydroxybenzoic acid | 58.45 g (0.423 mole) |

After replaced with nitrogen under reduced pressure, N$_2$ seal was made, and then 88.26 g (0.86 mole) of acetic anhydride was added. Under stirring, the reaction vessel was dipped in an oil bath at a temperature of 145° C. to conduct reaction for one hour, and then raised the temperature to 320° C. over 1.5 hours.

Then, a pressure was reduced from normal pressure to 10 mmHg over 45 minutes, and further reduced to 0.3 mmHg over minutes. Thereafter, the reaction was continued for one hour to complete polymerization reaction.

This polymer flew by gravity and was possible to be drawn out from the bottom of the reaction vessel. A melt viscosity (320° C., 100 sec$^{-1}$) of the polymer thus obtained was 320 poise.

This polymer was molded with a 0.1 oz injection molding machine at 320° C. and the molded pieces were measured by Vibron. The following results were obtained.

$|E^*|_{40}=10.5\times10^{10}$ dyne/cm$^2$(10.5 GPa)

$|E^*|_{150}=4.6\times10^{10}$ dyne/cm$^2$(4.6 GPa)

$|E^*|_{260}=3.9\times10^{10}$ dyne/cm$^2$(3.9 GPa)

Also, when tensile tests were carried out to obtain the following results.

| | |
|---|---|
| Tensile modulus | 61,700 kg/cm$^2$ |
| Tensile strength | 1,270 kg/cm$^2$ |
| Elongation at break | 3.1% |

Also, by using the same molded pieces, soldering resistance (260° C., 10 seconds) was measured but no change in appearance can be admitted.

Figure 2:
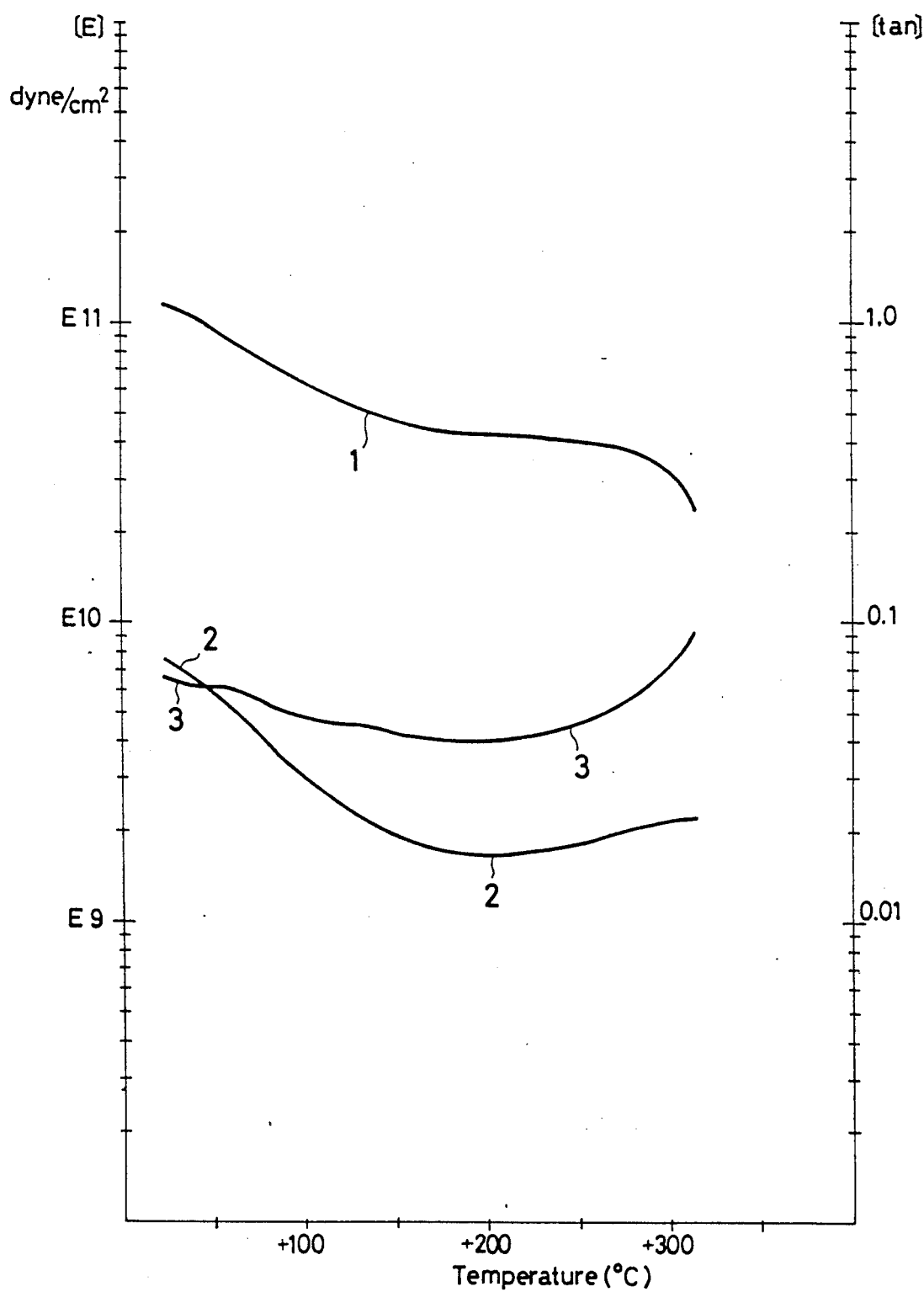
FIGS. 2, 6 and 8 are Vibron charts of the polymers respectively obtained in Examples 1, 28 and 32. The curves 1–3 in FIGS. 2, 6 and 8 depict dynamic modulus (E'), loss modulus (E'') and tan δ defined as E''/E', respectively.

IR spectrum chart of the polymer is shown in FIG. 1 and vibron chart thereof in FIG. 2. The compositional ratio of this polymer was (1)/(2)/(3)/(4)/(5)=11.5/11.5/11.5/11.5/54.

EXAMPLE 2

In a reactor equipped with a stirrer, an outlet for evacuation and a N$_2$ inlet, were charged the following starting materials.

| | |
|---|---|
| (1) 4,4'-dihydroxydiphenyl | 22.32 g (0.12 mole) |
| (2) methylhydroquinone | 7.44 g (0.06 mole) |
| (3) terephthalic acid | 19.92 g (0.12 mole) |
| (4) 2,6-naphthalenedicarboxylic acid | 12.96 g (0.06 mole) |
| (5) p-hydroxybenzoic acid | 57.96 g (0.42 mole) |

After replaced with nitrogen under reduced pressure, N$_2$ seal was made, and then 87.52 g (0.86 mole) of acetic anhydride was added. Under stirring, the reaction vessel was dipped in an oil bath at a temperature of 145° C. to conduct reaction for one hour, and then raised the temperature to 320° C. over 1.5 hours.

Then, a pressure was reduced from normal pressure to 10 mmHg over 45 minutes, and further reduced to 0.3 mmHg over 15 minutes. Thereafter, the reaction was continued for 2 hours to complete polymerization reaction.

This polymer flew by gravity and was possible to drawn out from the bottom of the reaction vessel. This polymer was molded with 0.1 oz injection molding machine at 320° C. and the molded pieces were measured by vibron to obtain the following results.

$|E^*|_{40}=15.0\times10^{10}$ dyne/cm$^2$(15.0 GPa)

$|E^*|_{150}=8.3\times10^{10}$ dyne/cm$^2$(8.3 GPa)

$|E^*|_{260}=6.8\times10^{10}$ dyne/cm$^2$(6.8 GPa)

Also, tensile tests were carried out to obtain the following results.

| | |
|---|---|
| Tensile modulus | 81,200 kg/cm$^2$ |
| Tensile strength | 1,670 kg/cm$^2$ |
| Elongation at break | 2.9% |

The water absorption of the polymer was measured to obtain the result of extremely low value of 0.02%.

Also, by using the same molded pieces, soldering resistance (260° C., 10 seconds) was measured but no change in appearance can be admitted.

Figure 3:
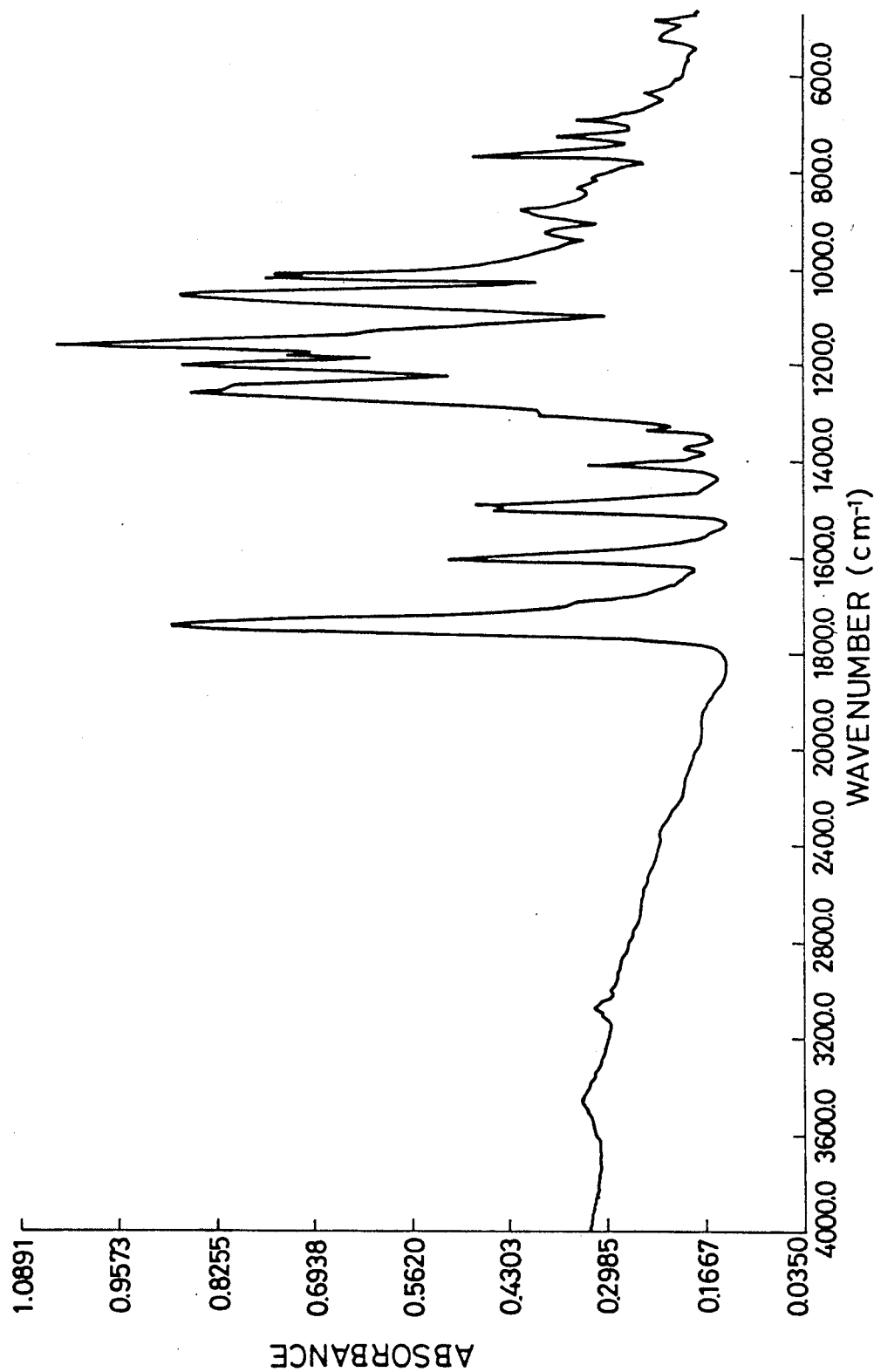
FIGS. 3–5 and 7 are IR charts of the polymers respectively obtained in Examples 1, 2, 3, 28 and 32.

IR spectrum chart of the polymer is shown in FIG. 3. The compositional ratio of this polymer was (1)/(2)/(3)/(4)/(5)=15.3/7.7/15.3/7.7/54.

EXAMPLE 3

In a 20 l vertical reactor equipped with a stirrer, an outlet for evacuation and a N$_2$ inlet, were charged the following starting materials.

| | |
|---|---|
| (1) 4,4'-dihydroxydiphenyl | 819 g (4.5 mole) |
| (2) trimethylhydroquinone | 669 g (4.5 mole) |
| (3) terephthalic acid | 730 g (4.5 mole) |
| (4) 2,6-naphthalenedicarboxylic acid | 950 g (4.5 mole) |
| (5) p-hydroxybenzoic acid | 2,833 g (21 mole) |

After replaced with nitrogen under reduced pressure, $N_2$ seal was made, and then 4,277 g (42 mole) of acetic anhydride was added. Under stirring, the mixture was reacted at 145° C. for one hour, and then raised the temperature to 320° C. and polymerization was carried out for 3 hours.

Final pressure was 0.5 mmHg.

This polymer flew by gravity and was possible to be drawn out from the bottom of the reactor. A melt viscosity (320° C., 100 sec$^{-1}$) of the polymer thus obtained was 210 poise.

This polymer was molded with a 0.1 oz injection molding machine at 320° C. and the molded pieces were measured by Vibron and to obtain the following results.

$|E^*|_{40} = 17.9 \times 10^{10}$ dyne/cm$^2$(17.9 GPa)

$|E^*|_{150} = 7.9 \times 10^{10}$ dyne/cm$^2$(7.9 GPa)

$|E^*|_{260} = 1.0 \times 10^{10}$ dyne/cm$^2$(1.0 GPa)

| | |
|---|---|
| Tensile modulus | 97,600 kg/cm$^2$ |
| Tensile strength | 1,490 kg/cm$^2$ |
| Elongation at break | 1.9% |

Also, by using the same molded pieces, soldering resistance (240° C., 10 seconds) was measured but no change in appearance can be admitted.

Figure 4:
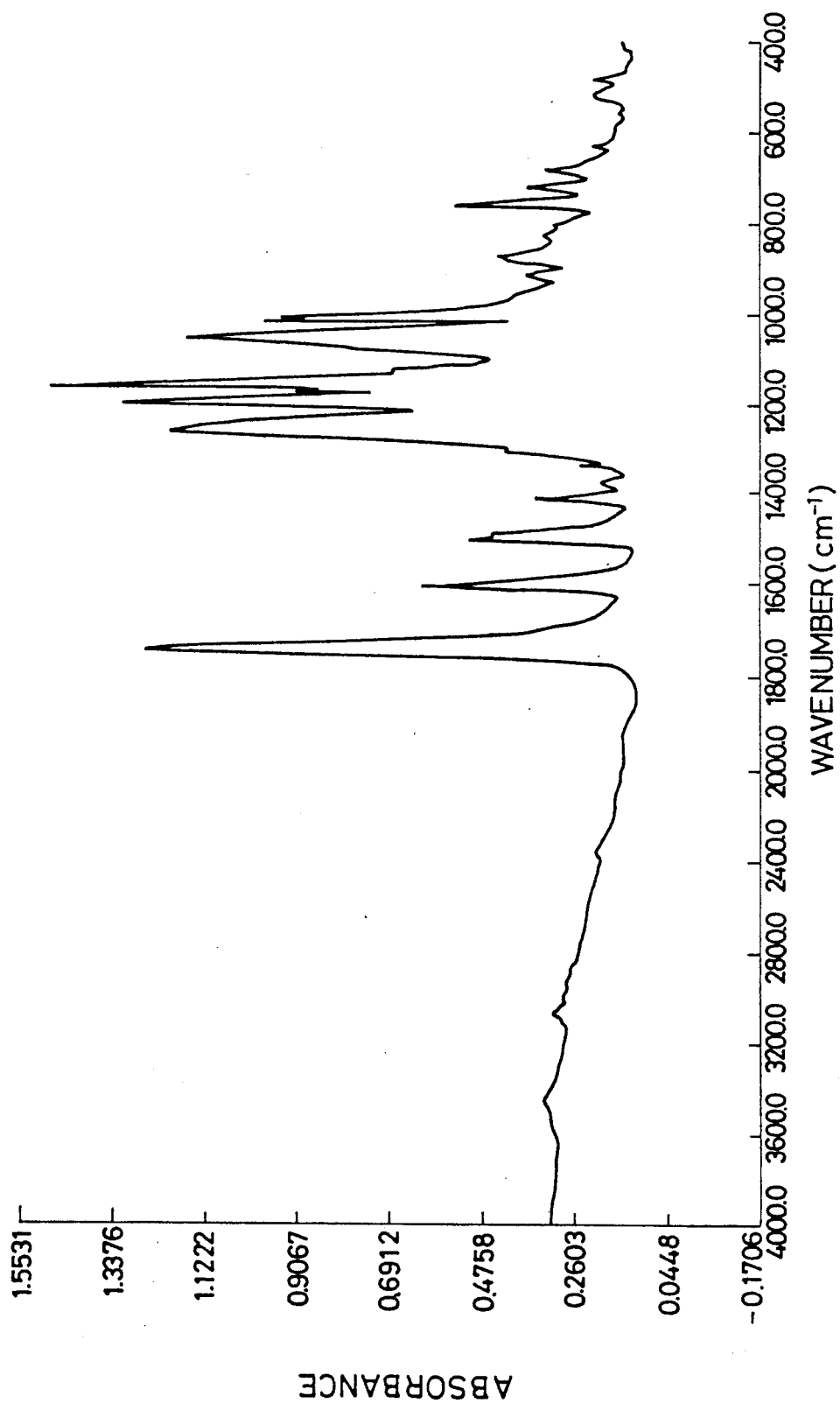

IR spectrum chart of the polymer is shown in FIG. 4. The compositional ratio of this polymer wa (1)/(2)/(3)/(4)/(5) = 11.5/11.5/11.5/11.5/54.

The polymer was added with 30 weight % of glass fiber, and after mixing and kneading with twin-screw extruder, it was molded by using 0.1 oz. injection molding machine to prepare dumbbell specimen.

When soldering resistance (260° C., 10 seconds) of the specimen was measured but no change in appearance can be admitted.

EXAMPLES 4–27

In the same manner as in Example 1 except for replacing monomers, compositional ratio and polymerization temperature as shown in Table 1, polymerization was effected. The results of measurement of physical properties are shown in Table 1.

TABLE 1

| Ex. No. | ![naphthalene dicarbonyl] | ![benzene dicarbonyl] | ![biphenyl ether] | —O—R—O— | ![p-hydroxybenzoyl] |
|---|---|---|---|---|---|
| 4 | 11.5 | 11.5 | 17.2 | ![resorcinol] 5.8 | 54 |
| 5 | 11.5 | 11.5 | 7.7 | ![hydroquinone] 15.3 | 54 |
| 6 | 11.5 | 11.5 | 15.3 | ![hydroquinone] 7.7 | 54 |
| 7 | 7.7 | 15.3 | 15.3 | ![hydroquinone] 7.7 | 54 |
| 8 | 12.5 | 4.2 | 12.5 | ![hydroquinone] 4.2 | 66.7 |

TABLE 1-continued

| Ex. No. |  |  | 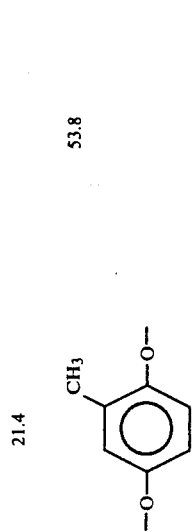 | 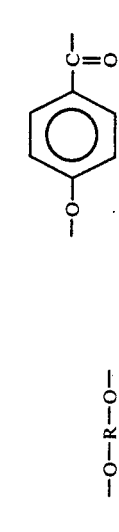 |  |  |
|---|---|---|---|---|---|---|
| 9 | 22.2 | 11.1 | 22.2 | 11.1 | | 33.3 |
| 10 | 7.1 | 21.4 | 7.1 | | 21.4 | 42.9 |
| 11 | 7.7 | 15.4 | 18.5 | | 4.6 | 53.8 |

| Ex. No. | Polymerization Temp. (°C.) | Drawing Out | Melt Viscosity (poise) | Complex Elastic Modulus |E*|40 (GPa) | |E*|150 (GPa) | |E*|260 (GPa) | Soldering Resistance Temp (°C.) | Soldering Resistance | Tensile Strength (kg/cm²) | Flow Initiating Temp. (°C.) | Liquid Crystallinity |
|---|---|---|---|---|---|---|---|---|---|---|---|
| 4 | 320 | good | — | — | — | — | 240 | good | — | — | good |
| 5 | 320 | good | 630 | 9.1 | 4.3 | 3.8 | 260 | good | 1320 | 317 | good |
| 6 | 320 | good | 570 | 10.7 | 5.4 | 4.6 | 260 | good | — | 303 | good |
| 7 | 320 | good | 480 | 11.3 | 5.8 | 4.8 | 260 | good | 1630 | 286 | good |
| 8 | 320 | good | 1320 | 8.3 | 4.1 | 3.7 | 260 | good | 1190 | 315 | good |
| 9 | 320 | good | 940 | 10.4 | 5.6 | 4.6 | 260 | good | 1560 | 310 | good |
| 10 | 320 | good | 1430 | — | — | — | 260 | good | — | — | good |
| 11 | 320 | good | 410 | 13.6 | 7.1 | 5.0 | 260 | good | 1490 | 316 | good |

Composition (mol %)

| Ex. No. |  |  | 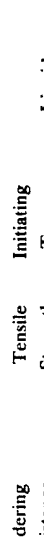 |  |  |  |
|---|---|---|---|---|---|---|

TABLE 1-continued

| # | | | | Structure | |
|---|---|---|---|---|---|
| 12 | 8.3 | 8.3 | 8.3 | 2-methyl-1,4-dimethoxybenzene | 66.7 |
| 13 | 7.7 | 15.3 | 15.3 | 2,3,5-trimethyl-1,4-dimethoxybenzene | 54 |
| 14 | 8.3 | 8.3 | 8.3 | 2,3,5-trimethyl-1,4-dimethoxybenzene | 66.7 |
| 15 | 11.1 | 22.2 | 26.7 | 1,4-dimethoxybenzene | 33.3 |
| 16 | 8.3 | 8.3 | 11.7 | 1,3-dimethoxybenzene | 66.7 |
| 17 | 15.4 | 7.7 | 11.5 | 2-methyl-1,4-dimethoxybenzene | 54 |

TABLE 1-continued

| Ex. No. | | | | | |
|---|---|---|---|---|---|
| 18 | 17.2 | 5.8 | 15.3 | (2,6-dimethylphenol structure) 7.7 | 54 |
| 19 | 15.4 | 7.7 | 7.7 | (2,6-dimethylphenol structure) 15.4 | 54 |

| Ex. No. | Polymerization Temp. (°C.) | Drawing Out | Melt Viscosity (poise) | Complex Elastic Modulus | | | Soldering Resistance | | Tensile Strength (kg/cm²) | Flow Initiating Temp. (°C.) | Liquid Crystallinity |
|---|---|---|---|---|---|---|---|---|---|---|---|
| | | | | $\|E^*\|_{40}$ (GPa) | $\|E^*\|_{150}$ (GPa) | $\|E^*\|_{260}$ (GPa) | Temp (°C.) | Resistance | | | |
| 12 | 320 | good | 520 | 17.2 | 8.4 | 6.3 | 260 | good | — | 312 | good |
| 13 | 320 | good | 570 | 14.2 | 7.6 | 4.8 | 260 | good | — | 303 | good |
| 14 | 320 | good | 480 | 13.3 | 6.1 | 4.8 | 260 | good | 1590 | 298 | good |
| 15 | 320 | good | 880 | 10.1 | 6.2 | 4.3 | 260 | good | — | 279 | good |
| 16 | 320 | good | 630 | 9.1 | 4.2 | 3.8 | 240 | good | 1320 | 317 | good |
| 17 | 320 | good | 570 | 10.7 | 5.4 | 2.1 | 240 | good | — | 282 | good |
| 18 | 300 | good | 480 | 11.3 | 5.8 | 2.2 | 240 | good | 1630 | 278 | good |
| 19 | 300 | good | 420 | 12.2 | 6.4 | 3.1 | 240 | good | — | 286 | good |

Composition (mol %)

| Ex. No. | (2,6-naphthalene dicarbonyl) | (terephthaloyl) | (4,4'-biphenyl dioxy) | —O—R—O— (2-methyl hydroquinone) | (4-oxybenzoyl) |
|---|---|---|---|---|---|
| 20 | 16.7 | 0 | 5.8 | 11.7 | 66.7 |

TABLE 1-continued
| | | | | |
|---|---|---|---|---|
| 21 | 23.0 | 0 | 15.3 |  53.8 7.7 |
| 22 | 11.5 | 11.5 | 18.4 | 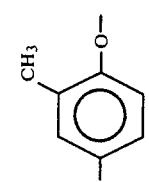 54 4.6 |
| 23 | 7.7 | 15.4 | 11.5 |  54 11.5 |
| 24 | 11.5 | 11.5 | 18.4 |  54 4.6 |
| 25 | 7.7 | 15.4 | 20.8 | 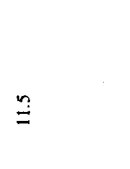 53.8 2.3 |

TABLE 1-continued

| | | | | |
|---|---|---|---|---|
| 26 | 7.7 | 15.4 | 18.4 | 53.8 |

Structures shown (Ex. 26): tetramethyl biphenyl diether with CH₃ groups.

| Ex. No. | Polymerization | | Melt Viscosity (poise) | Complex Elastic Modulus | | | Soldering Resistance | | Tensile Strength (kg/cm²) | Flow Initiating Temp. (°C.) | Liquid Crystallinity |
|---|---|---|---|---|---|---|---|---|---|---|---|
| | Temp. (°C.) | Drawing Out | | \|E*\|₄₀ (GPa) | \|E*\|₁₅₀ (GPa) | \|E*\|₂₆₀ (GPa) | Temp. (°C.) | Resistance | | | |
| 20 | 320 | good | — | — | — | — | 260 | good | — | — | good |
| 21 | 320 | good | — | — | — | — | 260 | good | — | — | good |
| 22 | 320 | good | 320 | 11.3 | 4.8 | 4.0 | 260 | good | 1300 | 300 | good |
| 23 | 320 | good | 180 | 14.3 | 5.5 | 3.8 | 260 | good | 1350 | 306 | good |
| 24 | 320 | good | 270 | 9.8 | 4.4 | 3.7 | 260 | good | 1190 | 316 | good |
| 25 | 320 | good | 165 | 13.4 | 5.3 | 3.0 | 260 | good | 1340 | 285 | good |
| 26 | 320 | good | 100 | 11.9 | 5.0 | 2.8 | 260 | good | 1360 | 281 | good |

Composition (mol %)

Structures shown (Ex. 27): 2,6-naphthalene dicarbonyl; terephthaloyl; 4,4'-biphenylene dioxy; —O—R—O— with methylhydroquinone; others (diphenyl ether dioxy).

| Ex. No. | | | | | |
|---|---|---|---|---|---|
| 27 | 7.7 | 15.4 | 15.8 | 53.8 | 4.6 |

Others: 2.7

| Ex. No. | Polymerization | | Melt Viscosity (poise) | Complex Elastic Modulus | | | Soldering Resistance | | Tensile Strength (kg/cm²) | Flow Initiating Temp. (°C.) | Liquid Crystallinity |
|---|---|---|---|---|---|---|---|---|---|---|---|
| | Temp. (°C.) | Drawing Out | | \|E*\|₄₀ (GPa) | \|E*\|₁₅₀ (GPa) | \|E*\|₂₆₀ (GPa) | Temp. (°C.) | Resistance | | | |
| 27 | 320 | good | 2150 | 9.3 | 3.5 | 3.1 | 260 | good | 1200 | 308 | good |

EXAMPLE 28

In a glass polymerization vessel equipped with a stirrer, an outlet for evacuation and a $N_2$ inlet, were charged 39.52 g (0.29 mole) of p-hydroxybenzoic acid, 15.70 g (0.11 mole) of p-aminobenzoic acid, 31.97 g (0.17 mole) of 4,4'-dihydroxydiphenyl, 14.26 g (0.09 mole) of terephthalic acid and 18.56 g (0.09 mole) of 2,6-naphthalenedicarboxylic acid. After repeating three times of reducing-nitrogen replacement, nitrogen was filled therein.

Then, 83.54 g of acetic anhydride was added dropwise and stirring was started, and the polymerization reactor was dipped in an oil bath at 150° C. while continuing stirring for one hour to effect acetylization. Thereafter, under nitrogen stream of 0.5 l/min, a temperature of the oil bath was raised to 320° C. over 90 minutes.

Then, a pressure was gradually reduced and polymerization was carried out for 2 hours.

Final reduced pressure was 0.3 mmHg.

The obtained polymer flew by gravity and was possible to be drawn out from the bottom of the reactor.

After making the resulting polymer to chips, they were dried in vacuum at 120° C. overnight.

A melt viscosity of this polymer was 460 poise at 320° C. and 100 sec$^{-1}$. Also, tensile properties of molded pieces molded by 0.1 oz injection molding machine were tensile strength of 1,810 kg/cm$^2$ and elongation at break of 3.1%. Water absorption was 0.04%.

Figure 5:
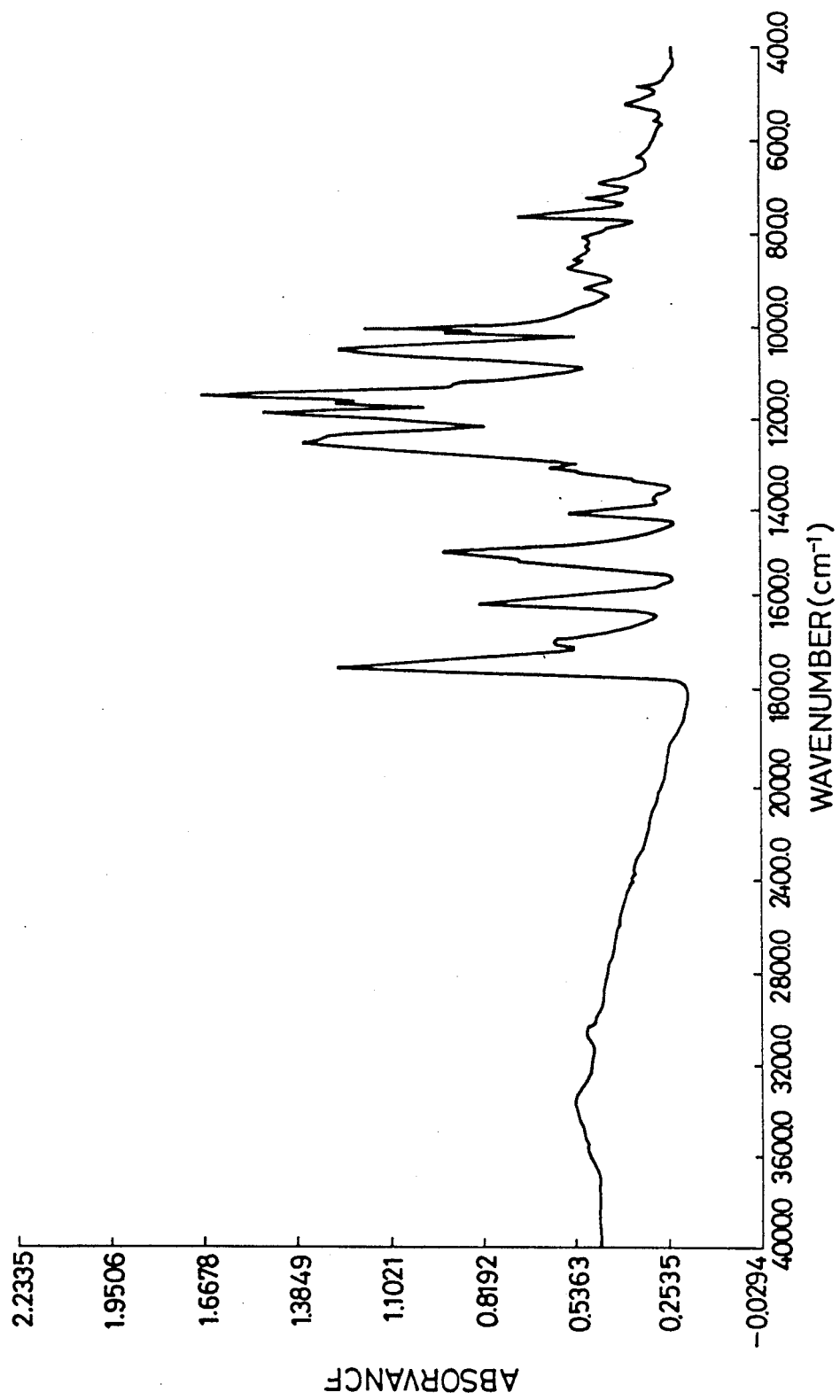
Figure 6:
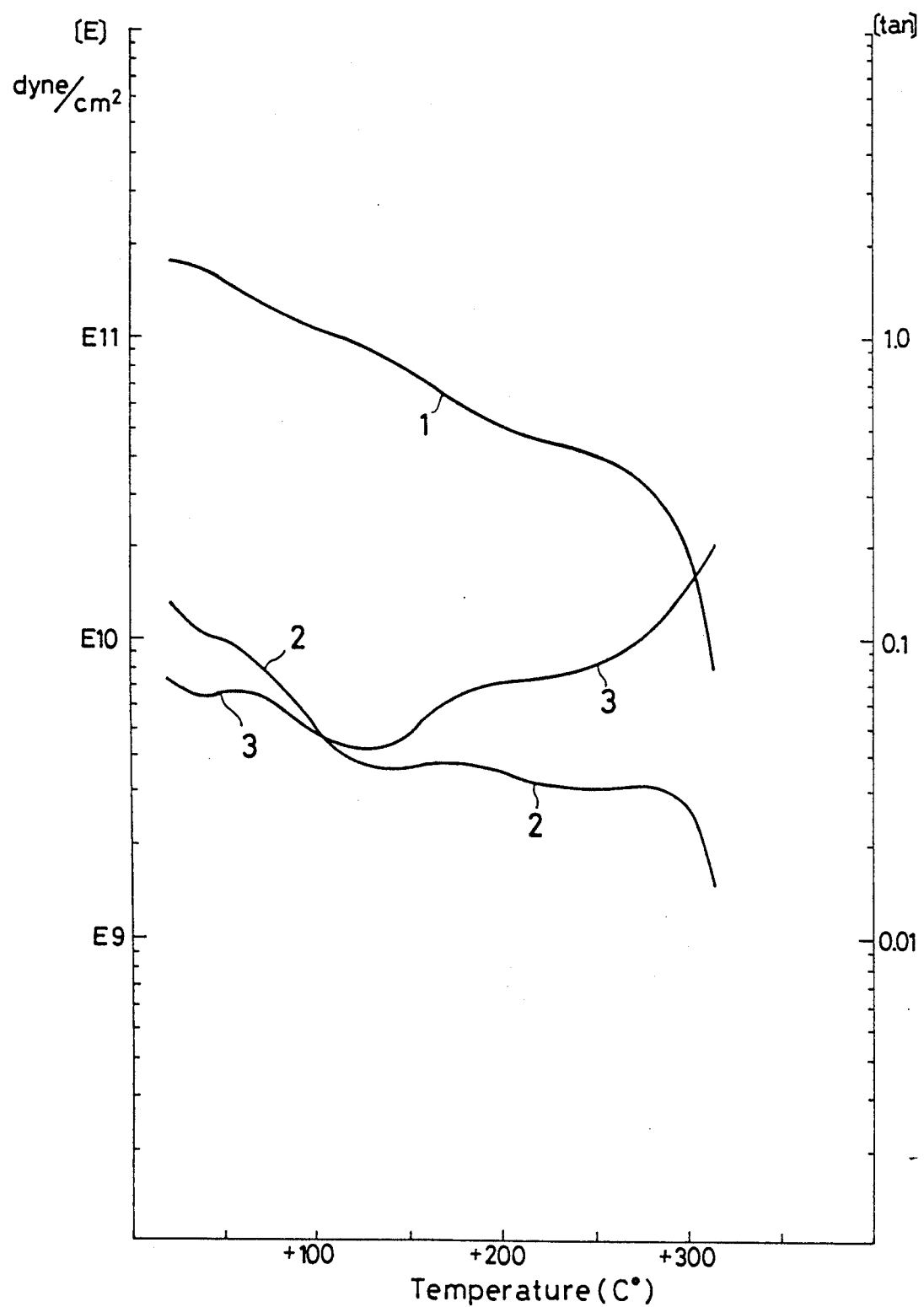

IR spectrum chart of the polymer is shown in FIG. 5 and Vibron chart of a molded piece prepared by using 0.1 oz injection molding machine in FIG. 6.

Further, the result of elemental analysis of the polymer was as follows.

C: 73.16% (74.16%)
H: 3.59% (3.73%)
N: 1.53% (1.50%)
(the value in the brackets is calculated one)

EXAMPLES 29 to 31

In the same manner as in Example 28 except for changing composition of each constitutional unit of the resulting polymer as shown in Table 2, the same experiment was carried out. Results of measured various physical properties are shown in Table 2.

Provided that, regarding to Example 29, elemental analysis and water absorption were measured to obtain the results as shown below.

[Results of elemental analysis (%)]

C: 73.91 (74.11),
H: 3.53 (3.68),
N: 0.71 (0.75)
(the value in the brackets is calculated one)

Water absorption 0.04%]

TABLE 2

| Ex. No. | -C(=O)-naphthalene-C(=O)- | -C(=O)-C6H4-C(=O)- | -O-C6H4-C6H4-O- | -O-C6H4-C(=O)- | -N(R)-C6H4-X- | Others |
|---|---|---|---|---|---|---|
| 29 | 11.5 | 11.5 | 23.1 | 46.2 | -NH-C6H4-C(=O)- 7.7 | 0 |
| 30 | 23.1 | 0 | 23.1 | 38.4 | -NH-C6H4-C(=O)- 15.4 | 0 |
| 31 | 11.5 | 11.5 | 20.8 | 46.2 | -NH-C6H4-C(=O)- 7.7 | -O-C6H3(CH3)-O- 2.3 |

| Ex. No. | Polymerization Temp. (°C.) | Drawing Out | Melt Viscosity (poise) | \|E*\|$_{40}$ (GPa) | \|E*\|$_{150}$ (GPa) | \|E*\|$_{260}$ (GPa) | Soldering Resistance Temp. (°C.) | Resistance | Tensile Strength (kg/cm$^2$) | Flow Initiating Temp. (°C.) | Liquid Crystallinity |
|---|---|---|---|---|---|---|---|---|---|---|---|
| 29 | 320 | good | 360 | 10.8 | 5.2 | 4.3 | 260 | good | 1350 | 315 | good |
| 30 | 320 | good | 540 | 13.9 | 6.5 | 3.9 | 260 | good | 1540 | 308 | good |
| 31 | 320 | good | 1120 | 10.9 | 4.3 | 3.9 | 260 | good | 1080 | 318 | good |

EXAMPLE 32

In a polymerization vessel equipped with a stirrer, an outlet for evacuation and a $N_2$ inlet, were charged 6.48 g (0.06 mole) of p-aminophenol, 22.10 g (0.12 mole) of 4,4'-dihydroxydiphenyl, 19.25 g (0.09 mole) of 2,6-naphthalenedicarboxylic acid, 14.79 g (0.09 mole) of terephthalic acid and 57.38 g (0.42 mole) of p-hydroxybenzoic acid. After replaced with nitrogen under reduced pressure, $N_2$ seal was made, and then 87.59 g (0.86 mole) of acetic anhydride was added. Under stirring, the polymerization vessel was dipped in an oil bath at a temperature of 145° C. to conduct reaction for one hour, and then raised the temperature to 320° C. over 1.5 hours. Then, reaction was carried out while reducing a pressure from normal pressure to 10 mmHg over 45 minutes, and further reduced to 3 mmHg over 15 minutes to complete the reaction.

The obtained polymer flew by gravity and was possible to be drawn out from the bottom of the reactor.

A melt viscosity of the polymer was 520 poise at 320° C. and 100 sec$^{-1}$. Also, as the results of Vibron measurement, dynamic moduli of $|E^*|_{40}$, $|E^*|_{150}$ and $|E^*|_{260}$ were $12.1 \times 10^{10}$ dyne/cm$^2$ (12.1 GPa), $5.0 \times 10^{10}$ dyne/cm$^2$ (5.0 GPa) and $3.30 \times 10^{10}$/cm$^2$ (3.30 GPa), respectively. Further, this polymer initiated flow at 309° C. and showed optical anisotropy (liquid crystallinity). As the result of soldering resistant test, a molded piece of the polymer was dipped in solder at 260° C. for 10 seconds but no change in appearance was observed whereby it showed good soldering resistance.

When tensile tests of a molded piece of the polymer was carried out to obtain good results of tensile modulus of 68,800 kg/cm$^2$, tensile strength of 1,350 kg/cm$^2$ and elongation at break of 3.6%.

Water absorption of the polymer was extremely low value of 0.04%.

Figure 7:
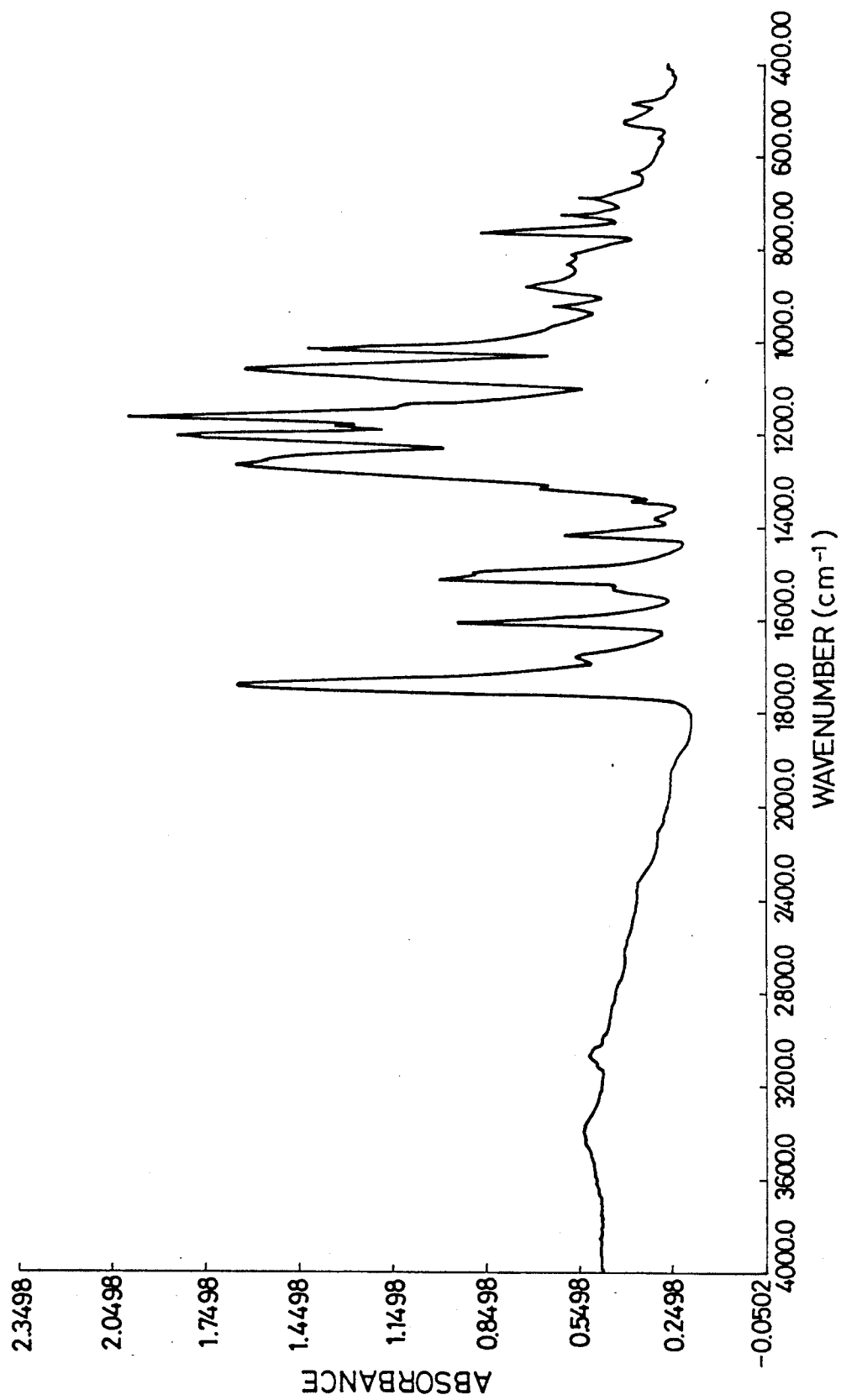
Figure 8:
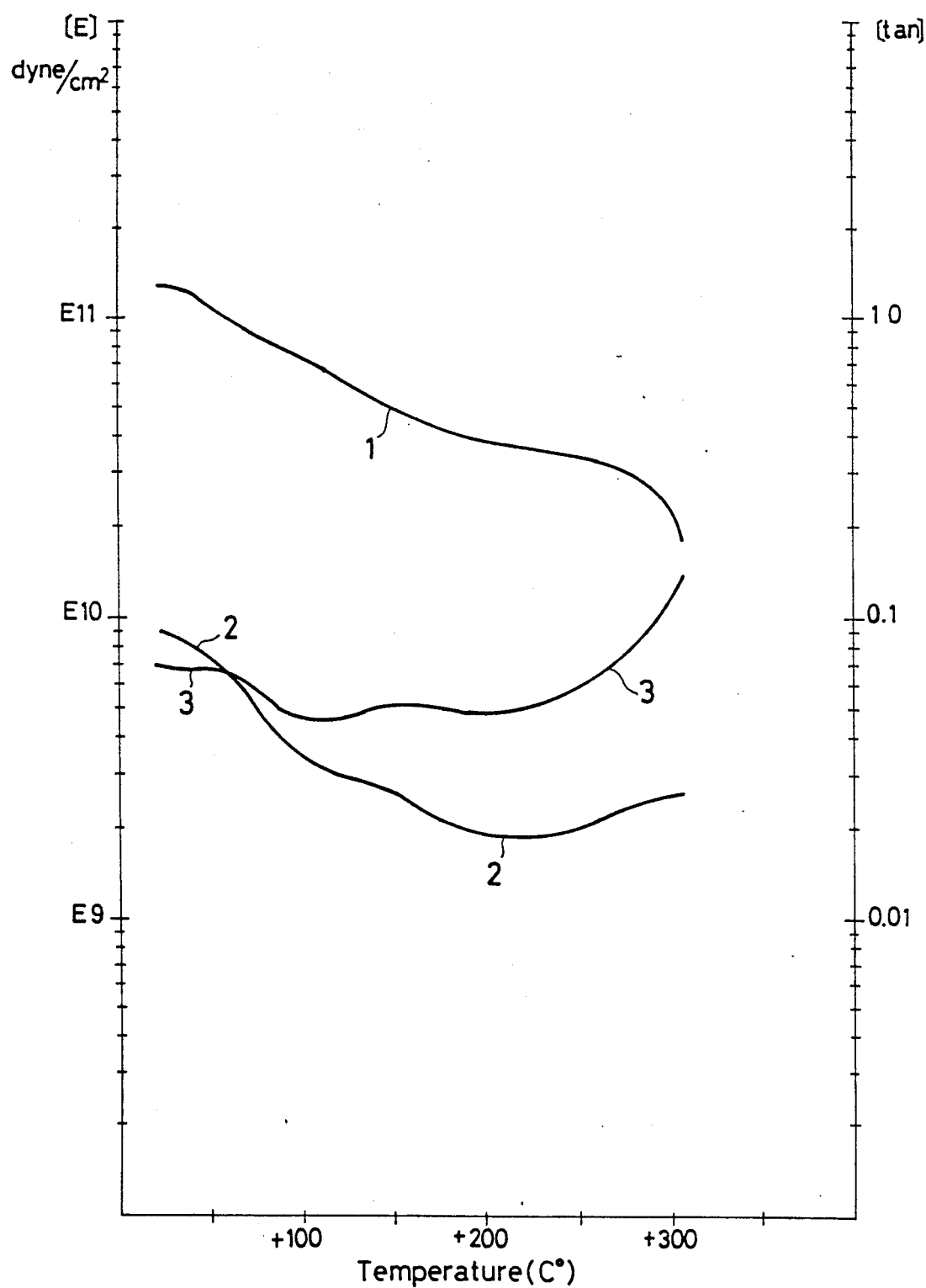

In FIGS. 7 and 8, IR spectrum chart and Vibron chart of the polymer are shown, respectively.

EXAMPLES 33 to 41

In the same manner as in Example 32 except for changing composition of each constitutional unit and polymerization temperature as shown in Table 3, polymers were obtained. The results of measurements of physical properties are shown in Table 3.

TABLE 3

| Ex. No. | Composition (mol %) | | | | | Others |
|---|---|---|---|---|---|---|
| | naphthalene dicarbonyl | terephthaloyl | biphenyl dioxy | oxybenzoyl | $-N(R)-\langle\rangle-X-$ | |
| 33 | 12.5 | 12.5 | 10.0 | 50.0 | -NH-⌬-O- 15.0 | 0 |
| 34 | 15.0 | 15.0 | 5.0 | 40.0 | -NH-⌬-O- 25.0 | 0 |
| 35 | 25.0 | 15.0 | 37.0 | 20.0 | -NH-⌬-O- 3.0 | 0 |
| 36 | 7.0 | 30.0 | 25.0 | 26.0 | -NH-⌬-O- 12.0 | 0 |
| 37 | 15.0 | 5.0 | 10.0 | 60.0 | -NH-⌬-O- 10.0 | 0 |
| 38 | 10.0 | 10.0 | 10.0 | 60.0 | -NH-⌬-O- 10.0 | 0 |
| 39 | 23.0 | 0 | 7.7 | 53.8 | -NH-⌬-O- 15.3 | 0 |
| 40 | 25.0 | 25.0 | 25.0 | 0 | -NH-⌬-O- 25.0 | 0 |

TABLE 3-continued

| 41 | 11.5 | 11.5 | 13.9 | 53.8 | ![structure with -NH-C6H4-O- and trimethyl phenyl] 7.7 1.5 |

| Ex. No. | Polymerization Temp. (°C.) | Drawing Out | Melt Viscosity (poise) | Complex Elastic Modulus |E*|40 (GPa) | |E*|150 (GPa) | |E*|260 (GPa) | Soldering Resistance Temp. (°C.) | Resistance | Tensile Strength (kg/cm²) | Flow Initiating Temp. (°C.) | Liquid Crystal- linity | Water Absorption (%) |
|---|---|---|---|---|---|---|---|---|---|---|---|---|
| 33 | 320 | good | 410 | 13.8 | 5.5 | 3.2 | 260 | good | 1480 | 315 | good | 0.04 |
| 34 | 320 | good | 920 | 10.9 | 4.6 | 3.1 | 260 | good | 1320 | 310 | good | 0.07 |
| 35 | 320 | good | 1580 | 11.8 | 4.5 | 3.1 | 260 | good | 1360 | 318 | good | 0.03 |
| 36 | 320 | good | 1490 | 10.6 | 4.2 | 3.0 | 260 | good | 1280 | 310 | good | 0.05 |
| 37 | 320 | good | 810 | 14.3 | 5.9 | 3.3 | 260 | good | 1500 | 313 | good | 0.03 |
| 38 | 320 | good | 990 | 11.8 | 5.0 | 3.2 | 260 | good | 1350 | 300 | good | 0.05 |
| 39 | 320 | good | 370 | 13.9 | 4.8 | 3.2 | 260 | good | 1540 | 317 | good | 0.04 |
| 40 | 320 | good | 1700 | 11.9 | 4.0 | 3.0 | 260 | good | 1120 | 316 | good | 0.05 |
| 41 | 320 | good | 1180 | 11.2 | 5.3 | 4.1 | 260 | good | 1210 | 308 | good | — |

COMPARATIVE EXAMPLES 1 to 5

In the same manner as in Example 1 except for changing composition of each constitutional unit as shown in Table 4, polymers were obtained. The results of measurements of physical properties are shown in Table 4.

(a) 3 to 15 mole % of 2,6-naphthalenedicarboxylic acid unit represented by the formula (1):

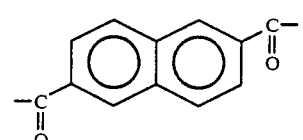
(1)

TABLE 4

| Comp. Ex. No. | Composition (mol %) | | | | |
|---|---|---|---|---|---|
| | 2,6-naphthalene dicarbonyl | terephthaloyl | -O-biphenyl-O- | -O-R-O- | -O-C6H4-C(O)- |
| 1 | 23.0 | 0 | 11.5 | -O-C6H4-O- 11.5 | 54 |
| 2 | 16.7 | 0 | 16.7 | 0 | 66.6 |
| 3 | 23.0 | 0 | 0 | -O-C6H4-O- 23.0 | 54 |
| 4 | 11.5 | 11.5 | 0 | -O-C6H4-O- 23.0 | 54 |
| 5 | 33.0 | 0 | 17 | -O-(t-butyl-C6H3)-O- 16 | 33 |

| Comp. Ex. No. | Polymerization Temp. (°C.) | Drawing Out | Melt Viscosity (poise) | Complex Elastic Modulus |E*|40 (GPa) | |E*|150 (GPa) | |E*|260 (GPa) | Soldering Resistance Temp (°C.) | Resistance | Tensile Strength (kg/cm²) | Flow Initiating Temp. (°C.) | Liquid Crystallinity |
|---|---|---|---|---|---|---|---|---|---|---|---|
| 1 | 320 | bad | impossible | — | — | — | — | — | — | — | — |
| 2 | 320 | bad | impossible | — | — | — | — | — | — | — | — |
| 3 | 320 | bad | impossible | — | — | — | — | — | — | — | — |
| 4 | 320 | bad | impossible | — | — | — | — | — | — | — | — |
| 5 | 320 | good | — | 13.0 | 7.4 | <2.0 | 240 | bad | — | — | — |

What is claimed is:

1. An aromatic polyester which consists essentially of (b) 7 to 25 mole % of terephthalic acid unit represented by the formula (2):

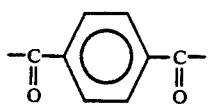 (2)

(c) 4 to 30 mole % of 4,4,'-dihydroxydiphenyl unit represented by the formula (3):

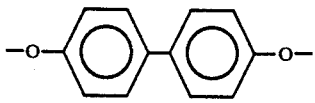 (3)

(d) 3 to 25 mole % of at least one member selected from the group consisting of aromatic diol units represented by the following formulae (4) and (5):

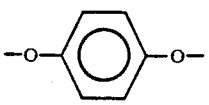 (4)

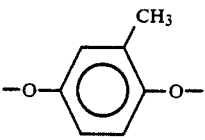 (5)

and
(e) 40 to 70 mole % of p-hydroxybenzoic acid represented by the formula (9):

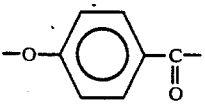 (9)

wherein when molar numbers of the above constitutional units represented by (1), (2), (3), (4), (5) and (9) are represented by {1}, {2}, {3}, {4}, {5} and {9}, respectively, the mole % is a value based on {1}+{2}+{3}+{4}+{5}+{9} and satisfies the following mathematical equation:

$$0.1 < \frac{\{4\} + \{5\}}{\{3\}} < 10$$

and has a soldering resistance at 260° C. for 10 sec and a melt viscosity of 10 poise or more at 320° C. and 100 sec$^{-1}$.

2. The aromatic polyester according to claim 1, wherein the melt viscosity at 320° C. and 100 sec$^{-1}$ is 100 poise or more.

3. The aromatic polyester according to claim 1, wherein the absolute values of complex elastic modulus of the aromatic polyester measured with a vibron at 110 Hz satisfy the following:

$|E^*|_{150}/|E^*|_{40} \geq \frac{1}{4}$ $|E^*|_{150} \geq 4.0 \times 10^{10}$ dyne/cm$^2$(4.0 GPa)

$|E^*|_{40} \geq 8.0 \times 10^{10}$ dyne/cm$^2$(8.0 GPa)

wherein $|E^*|_{40}$ and $|E^*|_{150}$ are the absolute values of complex elastic modulus measured at 40° C. and 150° C., respectively.

4. A process for producing the aromatic polyester according to claim 1, which comprises reacting
(f) 3 to 15 mole % of 2,6-naphthalenedicarboxylic acid represented by the formula (10):

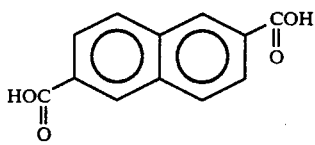 (10)

(g) 7 to 25 mole % of terephthalic acid represented by the formula (11):

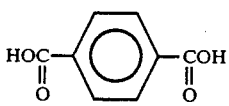 (11)

(h) 4 to 30 mole % of 4,4,-dihydroxydiphenyl represented by the formula (12):

 (12)

(i) 3 to 25 mole % of at least one member selected from the group consisting of aromatic diols represented by the following formulae (13) and (14):

 (13)

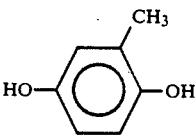 (14)

and
(j) 40 to 70 mnole % of p-hydroxybenzoic acid represented by the formula (18):

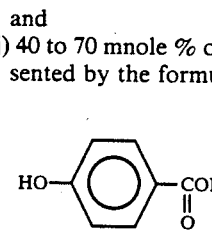 (18)

wherein when molar numbers of the above constitutional units represented by (10), (11), (12), (13), (14) and (18), are represented by {10}, {11}, {12}, {13}, {14} and {18}, respectively, the mole % is a value based on {10}+{11}+{12}+{13}+{14}+{18}, in the presence of an acid anhydride, and further reacting at a temperature of 100° to 400° C. while removing the acid- anhydride and the acids formed therefrom.

5. An aromatic polyester-amide which consists essentially of (k) 3 to 35 mole % of 2,6-naphthalenedicarboxylic acid unit represented by the formula (19):

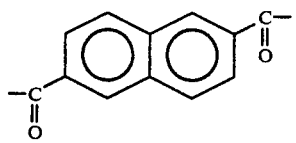
(19)

(l) 0 to 35 mole % of terephthalic acid unit represented by the formula (20):

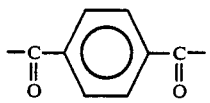
(20)

(m) 5 to 30 mole % of 4,4,'-dihydroxydiphenyl unit represented by the formula (21):

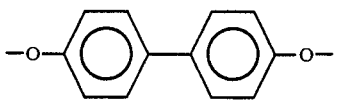
(21)

(n) 30 to 60 mole % of p-hydroxybenzoic acid unit represented by the formula (22):

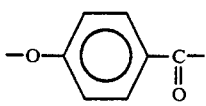
(22)

and
(o') 3 to 30 mole % of p-aminophenol unit represented by the formula (29):

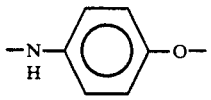
(29)

wherein when molar numbers of the above constitutional units represented by (19), (20), (21), (22) and (29) are represented by {19}, {20}, {21}, {22} and {29}, respectively, the mole % is a value based on {19}+{20}+{21}+{22}+{29}, and has a smoldering resistance at 260° C. for 10 sec and a melt viscosity of 10 poise or more at 320° C. and 100 sec$^{-1}$.

6. A process for producing the aromatic polyester-amide according to claim 5, which comprises reacting (p) 3 to 35 mole % of 2,6-naphthalenedicarboxylic acid represented by the formula (24):

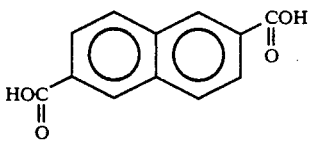
(24)

(q) 0 to 35 mole % of terephthalic acid represented by the formula (25):

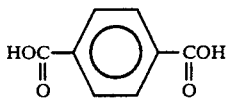
(25)

(r) 5 to 30 mole % of 4,4,'-dihydroxydiphenyl represented by the formula (26):

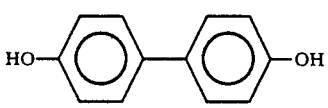
(26)

(s) 30 to 60 mole % of p-hydroxybenzoic acid represented by the formula (27):

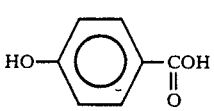
(27)

and
(t') 3 to 20 mole % of p-aminophenol represented by the formula (3):

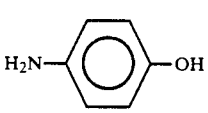
(30)

wherein when molar numbers of the above constitutional units represented by (24), (25), (26), (27) and (30) and represented by {24}, {25}, {26}, {27} and {30}, respectively, the mole % is a value based on {24}+{25}+{26}+{27}+{30}, in the presence of an acid anhydride, and further reacting at a temperature of 100° to 400° C. while removing the acid anhydride and the acids formed therefrom.

7. An aromatic polyester-amide which consists essentially of (k) 3 to 35 mole % of 2,6-naphthalenedicarboxylic acid unit represented by the formula (19):

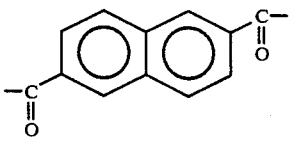
(19)

(l) 0 to 35 mole % of terephthalic acid unit represented by the formula (20):

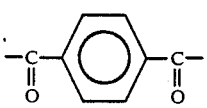
(20)

(m) 5 to 30 mole % of 4,4,'-dihydroxydiphenyl unit represented by the formula (21):

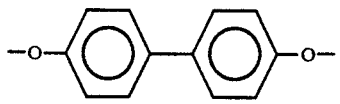

(n) 30 to 60 mole % of p-hydroxybenzoic acid unit represented by the formula (22):

and (o') 3 to 20 mole % of p-aminobenzoic acid unit represented by the formula (31):

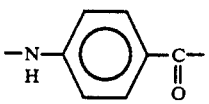

wherein when molar numbers of the above constitutional units represented by (19), (20), (21), (22) and (31) are represented by {19}, {20}, {21}, {22} and {31}, respectively, the mole % is a value based on {19}+{21}+{22}+{31}, and has a soldering resistance at 260° C. for 10 sec and a melt viscosity of 10 poise or more at 320° C. and 100 sec$^{-1}$.

8. A process for producing the aromatic polyester-amide according to claim 7, which comprises reacting (p) 3 to 35 mole % of 2,6-naphthalenedicarboxylic acid represented by the formula (24):

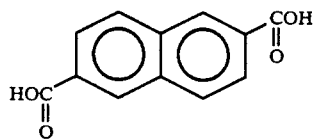

(q) 0 to 35 mole % of terephthalic acid represented by the formula (25):

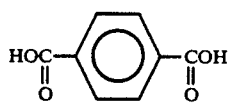

(r) 5 to 30 mole % of 4,4,-dihydroxydiphenyl represented by the formula (26):

(s) 30 to 60 mole % of p-hydroxybenzoic acid represented by the formula (27):

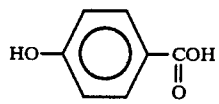

and (t") 3 to 20 mole % of p-aminbenzoic acid represented by the formula (32):

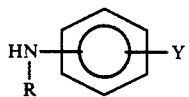

wherein when molar numbers of the above constitutional units represented by (24), (25), (26), (27) and (32) are represented by {24}, {25}, {26}, {27} and {32}, respectively, the mole % is a value based on {24}+{25}+{26}+{27}+{32}, in the presence of an acid anhydride, and further reacting at a temperature of 100° to 400° C. while removing the acid anhydride and the acids formed therefrom.

9. The aromatic polyester-amide according to claim 5 or 7, wherein the melt viscosity at 320° C. and 100 sec$^{-1}$ is 100 poise or more.

10. The aromatic polyester-amide according to claim 5 or 7, wherein the absolute values of complex elastic modulus of the aromatic polyester-amide measured with a vibron at 100 Hz satisfy the following relations:

$|E^*|_{150}/|E^*|_{40} \geq \frac{1}{3}$ $|E^*|_{150} \geq 4.9 \times 10^{10}$ dyne/cm$^2$(4.0 GPa)

$|E^*|_{40} \geq 8.0 \times 10^{10}$ dyne/cm$^2$(8.0 GPa)

wherein $|E^*|_{40}$ and $|E^*|_{150}$ are the absolute values of complex elastic modulus measured at 40° C. and 150° C., respectively.

* * * * *

UNITED STATES PATENT AND TRADEMARK OFFICE
CERTIFICATE OF CORRECTION

PATENT NO. : 5,025,082

DATED : June 18, 1991

INVENTOR(S) : Osamu Kishiro; Hiroshi Kamata and Hideko Sakai

It is certified that error appears in the above-identified patent and that said Letters Patent is hereby corrected as shown below:

Col. 41, L. 35, insert --unit-- after "acid".

Col. 41, L. 50, both "<" should read as --≦--.

Col. 42, L. 50, change "mnole" to --mole--.

Col. 43, L. 40, "30" should be --20--.

Col. 43, L. 54, change "smoldering" to --soldering--.

Col. 44, L. 30, change "(3)" to --(30)--.

Col. 44, L. 40, change the second occurrence of the word "and" to --are--.

Col. 45, L. 29, insert --+(20)-- after "(19)".

Col. 46, Lines 21-26, the formula should read as follows:

(32)

UNITED STATES PATENT AND TRADEMARK OFFICE
CERTIFICATE OF CORRECTION

PATENT NO. : 5,025,082

DATED : June 18, 1991

INVENTOR(S) : Osamu Kishiro, et al

It is certified that error appears in the above-identified patent and that said Letters Patent is hereby corrected as shown below:

Col. 46, line 41, "100" should be --110--.

Col. 46, line 45, "4.9" should be --4.0--.

Signed and Sealed this

First Day of December, 1992

*Attest:*

DOUGLAS B. COMER

*Attesting Officer*     *Acting Commissioner of Patents and Trademarks*